(12) United States Patent
Aoyama et al.

(10) Patent No.: US 9,348,178 B2
(45) Date of Patent: May 24, 2016

(54) LIQUID CRYSTAL DISPLAY PANEL AND LIQUID CRYSTAL DISPLAY DEVICE

(75) Inventors: Iori Aoyama, Osaka (JP); Takao Imaoku, Osaka (JP); Yuichi Iyama, Osaka (JP); Takatomo Yoshioka, Osaka (JP); Kazuhiko Tsuda, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 240 days.

(21) Appl. No.: 14/126,459

(22) PCT Filed: May 31, 2012

(86) PCT No.: PCT/JP2012/064225
§ 371 (c)(1),
(2), (4) Date: Dec. 16, 2013

(87) PCT Pub. No.: WO2013/001983
PCT Pub. Date: Jan. 3, 2013

(65) Prior Publication Data
US 2014/0118671 A1    May 1, 2014

(30) Foreign Application Priority Data

Jun. 27, 2011    (JP) .................................. 2011-142349

(51) Int. Cl.
*G02F 1/1337*    (2006.01)
*G02F 1/1343*    (2006.01)

(52) U.S. Cl.
CPC ........ *G02F 1/1337* (2013.01); *G02F 1/133707* (2013.01); *G02F 1/134309* (2013.01); *G02F 1/134363* (2013.01)

(58) Field of Classification Search
None
See application file for complete search history.

(56) References Cited

U.S. PATENT DOCUMENTS

| | | | |
|---|---|---|---|
| 6,111,626 A * | 8/2000 | Watanabe | G02F 1/134363 349/138 |
| 2005/0024548 A1 | 2/2005 | Choi et al. | |
| 2007/0126969 A1* | 6/2007 | Kimura et al. | 349/141 |

(Continued)

FOREIGN PATENT DOCUMENTS

| | | |
|---|---|---|
| JP | 04-350822 A | 12/1992 |
| JP | 2002-365657 A | 12/2002 |

(Continued)

OTHER PUBLICATIONS

Official Communication issued in International Patent Application No. PCT/JP2012/064225, mailed on Jul. 17, 2012.

(Continued)

*Primary Examiner* — Ryan Crockett
(74) *Attorney, Agent, or Firm* — Keating & Bennett, LLP

(57) ABSTRACT

The present invention provides a liquid crystal display panel and a liquid crystal display device each of which exhibits a sufficiently high response speed and an excellent transmittance. The liquid crystal display panel of the present invention includes a first substrate; a second substrate; and a liquid crystal layer disposed between the substrates, the first substrate and the second substrate each comprising an electrode, the electrode of the second substrate including a pair of comb-shaped electrodes and a planar electrode, the liquid crystal layer containing liquid crystal molecules which are inclined from an orthogonal direction to the main faces of the substrates between the pair of comb-shaped electrodes in a plan view of the main faces of the substrates when a voltage lower than a threshold voltage is applied.

14 Claims, 30 Drawing Sheets

(56) References Cited

U.S. PATENT DOCUMENTS

| | | | |
|---|---|---|---|
| 2010/0079720 A1* | 4/2010 | Wu et al. | 349/185 |
| 2010/0296041 A1 | 11/2010 | Kimura et al. | |
| 2011/0134353 A1 | 6/2011 | Kimura et al. | |
| 2011/0249038 A1* | 10/2011 | Yamazaki et al. | 345/690 |
| 2011/0310337 A1* | 12/2011 | Ishihara et al. | 349/123 |
| 2012/0194758 A1 | 8/2012 | Kimura et al. | |

FOREIGN PATENT DOCUMENTS

| | | |
|---|---|---|
| JP | 2006-523850 A | 10/2006 |
| JP | 2007-183583 A | 7/2007 |
| JP | 2009-186869 A | 8/2009 |
| JP | 2010-230744 A | 10/2010 |
| WO | 2010/137386 A1 | 12/2010 |

OTHER PUBLICATIONS

Suwa et al., "Novel Field-induced Pre-tilt Alignment Technique Using a Photo-reactive Alignment Layer for VA LCD", SID 10 Digest, 41.5L: Late-News Paper, 2010, pp. 595-598.

Miyakawa et al., "Advanced Hybrid FPA technology for the VA mode," IDW '10, LCT4-5L (Late-News Paper), 2010, pp. 595-596.

Lee et al., "Novel Surface-Stabilized Vertical Alignment Mode for High Transmittance and Fast Response", IMID/IDMC/ASIA Display 2010 Digest, 27-2, 2010, pp. 183 & 184.

Yoshioka et al.; "Liquid Crystal Display Panel, and Liquid Crystal Display Device"; U.S. Appl. No. 14/126,455, filed Dec. 16, 2013.

Iyama et al.; "Liquid Crystal Drive Device and Liquid Crystal Display Device"; U.S. Appl. No. 14/126,458, filed Dec. 16, 2013.

Imaoku et al.; "Liquid Crystal Display Panel and Liquid Crystal Display Device"; U.S. Appl. No. 14/126,461, filed Dec. 16, 2013.

\* cited by examiner

LIQUID CRYSTAL DISPLAY PANEL AND LIQUID CRYSTAL DISPLAY DEVICE

TECHNICAL FIELD

The present invention relates to a liquid crystal display panel and a liquid crystal display device. More specifically, the present invention relates to a liquid crystal display panel and a liquid crystal display device each of which aligns liquid crystal molecules in the orthogonal direction to the main faces of the substrates when no voltage is applied.

BACKGROUND ART

A liquid crystal display panel includes a pair of substrates such as glass substrates and a liquid crystal layer disposed therebetween. Such a liquid crystal display panel characteristically has a thin profile, a light weight, and a low power consumption, and is indispensable in everyday life and business as a display for devices including personal computers, televisions, onboard devices (e.g. automotive navigation systems), and personal digital assistants (e.g. mobile phones). In these applications, persons skilled in the art have studied liquid crystal display panels of various modes in which the placement of electrodes and the design of the substrates are different for changing the optical characteristics of the liquid crystal layer.

Examples of the display modes of current liquid crystal display devices include: a vertical alignment (VA) mode in which liquid crystal molecules having negative anisotropy of dielectric constant are aligned vertically to the substrate surfaces; an in-plane switching (IPS) mode in which liquid crystal molecules having positive or negative anisotropy of dielectric constant are aligned horizontally to the substrate surfaces and a transverse electric field is applied to the liquid crystal layer; and a fringe field switching (FFS) mode.

One document discloses, as a FFS-driving liquid crystal display device, a thin-film-transistor liquid crystal display having a high response speed and a wide viewing angle. The device includes a first substrate having a first common electrode layer; a second substrate having a pixel electrode layer and a second common electrode layer; a liquid crystal disposed between the first substrate and the second substrate; and a means for generating an electric field between the first common electrode layer of the first substrate and both of the pixel electrode layer and the second common electrode layer of the second substrate so as to provide high speed response to a fast input-data-transfer rate and a wide viewing angle for a viewer (for example, see Patent Literature 1).

Another document discloses, as a liquid crystal device with multiple electrodes applying a transverse electric field, a liquid crystal device including a pair of substrates opposite to each other; a liquid crystal layer which includes a liquid crystal having a positive anisotropy of dielectric constant and which is disposed between the substrates; electrodes which are provided to the respective first substrate and second substrate constituting the pair of substrates, facing each other with the liquid crystal layer therebetween, and which apply a vertical electric field to the liquid crystal layer; and multiple electrodes for applying a transverse electric field to the liquid crystal layer disposed on the second substrate (for example, see Patent Literature 2).

A technique of performing a photoalignment treatment such as field-induced photo-reactive alignment (FPA) has been drawing attention as a way of achieving initial alignment in which the liquid crystal molecules in contact with the alignment film are tilted (for example, Patent Literature 3 and Non Patent Literatures 1 to 3).

CITATION LIST

Patent Literature

Patent Literature 1: JP 2006-523850 T
Patent Literature 2: JP 2002-365657 A
Patent Literature 3: JP H4-350822 A

Non Patent Literature

Non Patent literature 1: S. Suwa, and 5 other authors, "Novel Field-induced Pre-tilt Alignment Technique Using a Photo-reactive Alignment Layer for VA LCD", SID 10 DIGEST, U.S., The Society for Information Display, 2010, pp. 595-598

Non Patent literature 2: M. Miyakawa, and 4 other authors, "Advanced Hybrid FPA technology for the VA mode", IDW'10, Japan, International Display Workshops, 2010, pp. 595-596

Non Patent literature 3: J. H. Lee, 7 other authors, "Novel Surface-Stabilized Vertical Alignment Mode for High Transmittance and Fast Response", IMID/IDMC/ASIA DISPLAY 2010 DIGEST, South Korea, International Meeting on Information Display/International Display Manufacturing Conference/ASIA DISPLAY 2010, pp. 183-184

SUMMARY OF INVENTION

Technical Problem

A liquid crystal display device in the FFS-driving mode achieves high-speed response by rotating the liquid crystal molecules by an electric field in both rising and falling. The rising (where the display state changes from a dark state (black display) to a bright state (white display)) utilizes a fringe electric field (FFS driving) generated between an upper slit electrode and a lower planar electrode of the lower substrate. The falling (where the display state changes from a bright state (white display) to a dark state (black display)) utilizes a vertical electric field generated by a potential difference between the substrates. If, however, the liquid crystal display to which such a fringe electric field is applied by slit electrodes contains vertically aligned liquid crystal molecules as described in Patent Literature 1, only the liquid crystal molecules near the slit electrode ends are rotated (cf. FIG. 40). Hence, the transmittance thereof is insufficient.

FIG. 38 is a schematic cross-sectional view showing a liquid crystal display panel having a conventional FFS-driving electrode structure on the lower substrate. FIG. 39 is a schematic plan view showing the liquid crystal display panel shown in FIG. 38. FIG. 40 shows simulation results of director D distribution, electric field distribution, and transmittance distribution of the liquid crystal display panel shown in FIG. 38. FIG. 38 shows the structure of the liquid crystal display panel. A certain voltage is applied to a slit electrode (14 V in the figure; for example, the potential difference between each slit electrode and a counter electrode 623 is at least the threshold value; the "threshold value" herein means a voltage value that generates an electric field causing optical changes of the liquid crystal layer and changes in the display state of the liquid crystal display device). Counter electrodes 613 and 623 are disposed on the substrate having the slit electrodes and its opposite substrate, respectively. The counter electrodes 613 and 623 are each set to 7 V. FIG. 40 shows the simulation results in rising, which shows voltage distribution, director D distribution, and transmittance distribution (solid line).

Patent Literature 2 teaches a liquid crystal display device having a three-layered electrode structure which employs comb driving to increase the response speed. Patent Literature 2, however, merely substantially mentions a liquid crystal device in the twisted nematic (TN) display mode, and does not show any liquid crystal display device in a vertical alignment mode which is advantageous to achieve characteristics such as a wide viewing angle and a high contrast. These prior art documents do not teach changing the tilt angle of part of the liquid crystal molecules between slit electrodes.

The present invention has been made in view of the above state of the art, and aims to provide a liquid crystal display panel and a liquid crystal display device each of which exhibits a sufficiently high response speed and an excellent transmittance, with its liquid crystal layer that contains liquid crystal molecules aligned in the orthogonal direction to the main faces of the substrates when no voltage is applied.

Solution to Problem

The present inventors have considered achieving both a high response speed and a high transmittance in a vertical alignment liquid crystal display panel and a vertical alignment liquid crystal display device, and have focused on a three-layered electrode structure which controls the alignment of liquid crystal molecules by an electric field in both rising and falling. The present inventors have further considered the electrode structures, and have found that, when a first substrate and a second substrate having a liquid crystal layer disposed therebetween each have an electrode and the electrode of the second substrate includes a pair of comb-shaped electrodes, a transverse electric field can be generated by the potential difference between the pair of comb-shaped electrodes in rising, and a vertical electric field can be generated by the potential difference between the substrates in falling. This three-layered electrode structure enables suitable switching between the vertical electric field ON state and the transverse electric field ON state. The three-layered electrode structure has been found to provide a high response speed by rotating liquid crystal molecules by an electric field in both rising and falling, as well as a high transmittance by the transverse electric field generated in comb driving. Furthermore, the present inventors have found that a high response speed and a high transmittance are achieved by inclining the liquid crystal molecules between the comb-shaped electrodes from the normal direction to the substrates (i.e., giving a pretilt angle to the liquid crystal molecules) among the liquid crystal molecules vertically aligned uniformly in a plane. The present inventors have therefore overcome the defects, completing the present invention. A feature of the present invention is that a high response speed and a high transmittance are achieved in a liquid crystal display device having a vertical alignment three-layered electrode structure. Also, inclining the liquid crystal molecules between the comb-shaped electrodes from the normal direction to the substrates makes the effect of the present invention significant. These features differentiate the present invention from the inventions described in the prior art documents. More specifically, the present invention increases the response speed having been problematic especially at low temperatures, and also achieves an excellent transmittance.

One aspect of the present invention is a liquid crystal display panel including: a first substrate; a second substrate; and a liquid crystal layer disposed between the substrates, the first substrate and the second substrate each comprising an electrode, the electrode of the second substrate including a pair of comb-shaped electrodes and a planar electrode, the liquid crystal layer containing liquid crystal molecules which, when a voltage lower than a threshold voltage is applied, are inclined from an orthogonal direction to the main faces of the substrates, between the pair of comb-shaped electrodes in a plan view of the main faces of the substrates.

The liquid crystal layer in the liquid crystal display panel of the present invention contains liquid crystal molecules which, when a voltage lower than the threshold voltage is applied, are inclined from the orthogonal direction to the main faces of the substrates between the pair of comb-shaped electrodes in a plan view of the main faces of the substrates. That is, the liquid crystal layer at least includes a portion where the alignment direction is different from the orthogonal direction between the pair of comb-shaped electrodes in a plan view of the main faces of the substrates. The liquid crystal layer preferably contains liquid crystal molecules inclined from the orthogonal direction to the main faces of the substrates especially on the second substrate side. The liquid crystal display panel of the present invention at least includes liquid crystal molecules inclined from the orthogonal direction to the main faces of the substrates in a portion of the liquid crystal layer corresponding to the portion between the pair of comb-shaped electrodes in a plan view of the main faces of the substrates. Here, the phrase "inclined from the orthogonal direction to the main faces of the substrates" means that the inclination is regarded as "being inclined" even slightly in the technical field of the present invention. The inclination is preferably, for example, at least 25° from the orthogonal direction to the main faces of the substrates. The upper limit for the inclination is, for example, 60°. The inclination is not limited to the above range, and may be at any angle regarded as being "inclined" in the technical field of the present invention.

In the present invention, the liquid crystal molecules between the pair of comb-shaped electrodes in the liquid crystal layer are partly inclined from the orthogonal direction to the main faces of the substrates at an angle regarded as a tilt angle when a voltage lower than the threshold voltage is applied. A tilt under a voltage lower than the threshold voltage (inclination in the initial alignment) is also referred to as a pretilt herein.

To provide the pretilt, the second substrate preferably has a pretilt-providing structure between the pair of comb-shaped electrodes in a plan view of the main faces of the substrates. For example, in a preferred mode, the liquid crystal display panel further comprises an insulating layer between the pair of comb-shaped electrodes and the planar electrode in the second substrate in a cross-sectional view of the main faces of the substrates, and the pretilt-providing structure is a recess formed on the insulating layer between the pair of comb-shaped electrodes in a plan view of the main faces of the substrates. In another preferred mode, the recess is formed at the center of a portion between the pair of comb-shaped electrodes in a plan view of the main faces of the substrates. In yet another preferred mode, the recess constitutes the entire portion between the pair of comb-shaped electrodes in a plan view of the main faces of the substrates.

In yet another preferred embodiment, the pretilt-providing structure is a polymer on a face of the second substrate, the face being in contact with the liquid crystal layer. For example, to achieve the above tilt angle, the insulating layer of the second substrate is preferably subjected to a photo-alignment treatment. Also to achieve the above tilt angle, a photo-alignment treatment is preferably performed. If, for example, a photo-alignment treatment such as field-induced photo-reactive alignment (FPA) or polymer stabilized vertical alignment (PSA) is performed to achieve the initial alignment where the liquid crystal molecules in contact with the alignment film are provided with a tilt angle, a higher response speed can be achieved.

In the above liquid crystal layer, liquid crystal molecules other than the liquid crystal molecules inclined from the orthogonal direction to the main faces of the substrates are usually aligned in the orthogonal direction to the main faces of the substrates under a voltage lower than the threshold voltage. In this respect, the liquid crystal layer can be considered to be a "vertical alignment liquid crystal element" or of "vertical alignment type". Here, "the liquid crystal molecules aligned in the orthogonal direction to the main faces of the substrates" are molecules regarded as being aligned vertically to the main faces of the substrates in the technical field of the present invention, including those substantially aligned in the orthogonal direction. Such a vertical alignment liquid crystal display panel is advantageous to achieve characteristics such as a wide viewing angle and a high contrast, and is now used in wide applications.

The liquid crystal display panel preferably further has a dielectric layer (overcoat layer) in the first substrate. An overcoat layer makes the transverse electric field intensity high on the opposed substrate side (upper portion of the liquid crystal layer), thereby increasing the efficiency of light utilization to increase the transmittance. In the case that, for example, the substrate has color filters, the overcoat layer has an effect of flattering the color filter layer.

The liquid crystal display panel of the present invention includes a pair of comb-shaped electrodes and a lower electrode for the second substrate, and a counter electrode for the other of the pair of substrates. That is, the liquid crystal display panel includes at least four electrodes. The pair of comb-shaped electrodes preferably satisfies that two comb-shaped electrodes are disposed opposite to each other in a plan view of the main faces of the substrates. This pair of comb-shaped electrodes suitably generates a transverse electric field therebetween. With a liquid crystal layer including liquid crystal molecules having positive anisotropy of dielectric constant, the response performance and the transmittance are excellent in rising. With a liquid crystal layer including liquid crystal molecules having negative anisotropy of dielectric constant, the liquid crystal molecules are rotated by a transverse electric field to provide a high response speed in falling. The electrodes of the first substrate and the second substrate provide a potential difference between the substrates. This generates a vertical electric field by the potential difference between the substrates in falling with a liquid crystal layer including liquid crystal molecules having positive anisotropy of dielectric constant and in rising with a liquid crystal layer including liquid crystal molecules having negative anisotropy of dielectric constant, and rotates the liquid crystal molecules by the electric field to provide a high response speed.

The pair of comb-shaped electrodes may be disposed on the same layer or may be disposed on different layers as long as it provides the effects of the present invention. The pair of comb-shaped electrodes is preferably disposed on the same layer. The phrase "a pair of comb-shaped electrodes is disposed on the same layer" herein means that the comb-shaped electrodes are in contact with the same component (e.g. insulating layer, liquid crystal layer) on the liquid crystal layer side and/or the opposite side of the liquid crystal layer side.

The pair of comb-shaped electrodes preferably satisfies that the teeth portions are along each other in a plan view of the main faces of the substrates. Particularly preferably, the teeth portions of the pair of comb-shaped electrodes are substantially parallel with each other; in other words, each of the comb-shaped electrodes has multiple substantially parallel slits.

The pair of comb-shaped electrodes preferably has different electric potentials at a threshold voltage or higher. The term "threshold voltage or higher" means that a voltage value that provides a transmittance of 5% with the transmittance in the bright state defined as 100%, for example. The phrase "have different electric potentials at a threshold voltage or higher" herein at least means that a driving operation that generates different electric potentials at a threshold voltage or higher can be implemented. This makes it possible to suitably control the electric field applied to the liquid crystal layer. The upper limit of each of the different electric potentials is preferably 20 V, for example. Examples of a structure for providing different electric potentials include a structure in which one comb-shaped electrode of the pair of comb-shaped electrodes is driven by a certain TFT while the other comb-shaped electrode is driven by another TFT or the other comb-shaped electrode communicates with the electrode disposed below the other comb-shaped electrode. This structure makes it possible to provide different electric potentials. The width of each tooth portion of the pair of comb-shaped electrodes is preferably 2 µm or greater, for example. The gap (also referred to as the space herein) between tooth portions is preferably 2 to 7 µm, for example.

The liquid crystal display panel is preferably arranged such that the liquid crystal molecules in the liquid crystal layer are aligned in the orthogonal direction to the main faces of the substrates by an electric field generated between the pair of comb-shaped electrodes or between the first substrate and the second substrate. Preferably, the electrode of the first substrate is a planar electrode. The term "planar electrode" herein includes a mode in which electrode portions in multiple pixels are electrically connected. Preferable examples of such a mode of the planar electrode of the first substrate include a mode in which electrode portions in all of the pixels are electrically connected, and a mode in which electrode portions in a pixel line are electrically connected.

The second substrate is provided with a planar electrode. The planar electrode suitably generates a vertical electric field to achieve a high response speed. A particularly preferable mode is such that the electrode of the first substrate is a planar electrode, and the above-described planar electrode is provided to the second substrate. This makes it possible to suitably generate a vertical electric field by a potential difference between the substrates in falling, thereby providing a high response speed. A particularly preferable mode for suitable application of a transverse electric field and a vertical electric field is such that the electrodes (upper electrodes) at the side of the liquid crystal layer of the second substrate constitute a pair of comb-shaped electrodes and the electrode (lower electrode) opposite to the side of the liquid crystal layer of the second substrate is a planar electrode. The planar electrode of the second substrate is typically formed below the pair of comb-shaped electrodes with an electrical resistance layer interposed therebetween. The electrical resistance layer is preferably an insulating layer. The insulating layer may be any layer regarded as an insulating layer in the technical field of the present invention. For example, the planar electrode of the second substrate can be provided below the pair of comb-shaped electrodes of the second substrate (in the layer in the second substrate opposite to the liquid crystal layer), with an insulating layer interposed therebetween. Portions of the planar electrode of the second substrate are preferably electrically connected in a pixel line, but the planar electrode may be driven separately in each pixel unit. In the case where one of the pair of the comb-shaped electrodes is communicated with the planar electrode that is a lower electrode of the comb-shaped electrodes and the planar electrode is constituted by electrode portions electrically connected in a pixel line, the comb-shaped electrodes communicated with the planar electrode are also electrically connected in a pixel line. This mode is also one preferable mode of the present invention. The planar electrode of the second substrate is preferably planar at least at the portion overlapping the electrode of the first substrate in a plan view of the main faces of the substrates.

In the case where the second substrate is an active matrix substrate, for example, the term "pixel line" herein means an array of pixels aligned along the gate bus line in the active matrix substrate in a plan view of the main faces of the substrates. As mentioned above, electric connection of portions of the planar electrode of the first substrate in a pixel line and/or portions of the planar electrode of the second substrate in a pixel line enables application of a voltage to the electrodes so as to invert the electric potential change between pixels corresponding to each even-numbered gate bus line and pixels corresponding to each odd-numbered gate bus line, thereby suitably generating a vertical electric field to provide a high response speed.

The "planar electrode(s)" of the first substrate and/or the second substrate herein at least satisfies/satisfy the state regarded as having a planar shape in the technical field of the present invention, and may have an alignment-controlling structure such as a rib or a slit in a certain region or may have such an alignment-controlling structure at the center portion of a pixel in a plan view of the main faces of the substrates. Still, preferably, the planar electrode has substantially no alignment-controlling structure.

The liquid crystal molecules in the liquid crystal layer are usually aligned by an electric field generated between a pair of comb-shaped electrodes or between the first substrate and the second substrate so that it contains a component horizontal to the main faces of the substrates at a threshold voltage or higher. In particular, the liquid crystal molecules preferably include those aligned in the horizontal direction. The phrase "aligned in the horizontal direction" herein at least satisfies the state regarded as being aligned in the horizontal direction in the technical field of the present invention. This further improves the transmittance. The liquid crystal molecules in the liquid crystal layer preferably substantially consist of liquid crystal molecules aligned in the horizontal direction to the main faces of the substrates at a threshold voltage or higher.

The liquid crystal layer preferably includes liquid crystal molecules having positive anisotropy of dielectric constant (positive liquid crystal molecules). The liquid crystal molecules having positive anisotropy of dielectric constant are aligned in a certain direction when an electric field is applied. The alignment thereof is easily controlled and such molecules provide a higher response speed. The liquid crystal layer may also preferably include liquid crystal molecules having negative anisotropy of dielectric constant (negative liquid crystal molecules). This further improves the transmittance. From the viewpoint of a high response speed, the liquid crystal molecules preferably substantially consist of liquid crystal molecules having positive anisotropy of dielectric constant. From the viewpoint of a transmittance, the liquid crystal molecules preferably substantially consist of liquid crystal molecules having negative anisotropy of dielectric constant.

At least one of the first substrate and the second substrate is usually provided with an alignment film on the liquid crystal layer side. The alignment film is preferably a vertical alignment film. When the first substrate and the second substrate each are provided with a vertical alignment film and the second substrate has the above-described pretilt-providing structure, the pretilt for the liquid crystal molecules in the present invention can be suitably controlled, so that the effect of the present invention will be significant. Examples of the alignment film include alignment films formed from an organic material or an inorganic material, and photo-alignment films formed from a photoactive material. The alignment film may be an alignment film without any alignment treatment such as rubbing. Alignment films formed from an organic or inorganic material and photo-alignment films each enable simplification of the process to reduce the cost, as well as improvement in the reliability and the yield. If an alignment film is rubbed, the rubbing may cause disadvantages such as liquid crystal contamination due to impurities from rubbing cloth, dot defects due to contaminants, and uneven display due to uneven rubbing in each liquid crystal panel. The present invention can eliminate these disadvantages. At least one of the first substrate and the second substrate preferably has a polarizing plate on the side opposite to the liquid crystal layer. The polarizing plate is preferably a circularly polarizing plate. This makes it possible to further improve the transmittance, and also to suppress reflection in the panel, improving the visibility under bright conditions such as the outdoor conditions. This improvement in the visibility is the largest advantage of using a circularly polarizing plate. The polarizing plate may also preferably be a linearly polarizing plate. This makes it possible to give excellent viewing angle characteristics.

The liquid crystal display panel of the present invention usually generates a vertical electric field; in other words, it generates a potential difference at least between the electrode of the first substrate and an electrode (e.g. a planar electrode) of the second substrate. A preferable mode thereof is such that a higher potential difference is generated between the electrode of the first substrate and an electrode of the second substrate than that between electrodes (e.g. a pair of comb-shaped electrodes) of the second substrate.

After generating a vertical electric field, the liquid crystal display panel of the present invention may generate substantially no potential difference between the planar electrode of the first substrate and the planar electrode of the second substrate, and may also generate no potential difference between the pair of comb-shaped electrodes of the second substrate. In other words, the liquid crystal display panel may implement a driving operation that generates substantially no potential difference between every electrode, including the electrode (e.g., planar electrode) of the first substrate and the electrodes (e.g., pair of comb-shaped electrodes and planar electrode) of the second substrate. This mode suitably controls the alignment of the liquid crystal molecules, especially those near the edges of the pair of comb-shaped electrodes, and sufficiently decreases the transmittance, which stays slightly high unless every electrode has equal electric potential, to the initial black state.

After generating a transverse electric field, the liquid crystal display panel of the present invention usually generates a potential difference at least between electrodes (e.g., pair of comb-shaped electrodes) of the second substrate. For example, the panel may be in a mode such that a higher potential difference is generated between electrodes of the second substrate than that between the electrode of the first substrate and an electrode (e.g. planar electrode) of the second substrate. The panel may be in a mode such that a lower potential difference is generated between electrodes of the second substrate than that between the electrode of the first substrate and an electrode of the second substrate.

Here, the commonly connected lower electrodes (the planar electrode of the second substrate) corresponding to even-numbered gate-bus lines and the commonly connected lower electrodes (the planar electrode of the second substrate) corresponding to odd-numbered gate-bus lines may be formed, and the electric potential changes thereof may be inverted in response to application of a voltage to these lower electrodes. The electric potential of an electrode maintained at a certain voltage may be defined as a middle electric potential. Assuming that this electric potential of an electrode maintained at this certain voltage is 0 V, the polarity of the voltage applied to the lower electrodes is considered to be inverted in each bus line.

The first substrate and the second substrate of the liquid crystal display panel of the present invention constitute a pair of substrates sandwiching the liquid crystal layer. They each may have an insulation substrate (e.g. glass, resin) as its base material, and the substrates are formed by disposing lines, electrodes, color filters, and the like on the insulation substrate.

Preferably, at least one of the pair of comb-shaped electrodes is a pixel electrode and the second substrate having the pair of comb-shaped electrodes is an active matrix substrate. The liquid crystal display panel of the present invention may be of a transmission type, a reflection type, or a transflective type.

The present invention also relates to a liquid crystal display device including the liquid crystal display panel of the present invention. Preferable modes of the liquid crystal display panel in the liquid crystal display device of the present invention are the same as the aforementioned preferable modes of the liquid crystal display panel of the present invention. Examples of the liquid crystal display device include displays of personal computers, televisions, onboard devices such as automotive navigation systems, and personal digital assistants such as mobile phones. Particularly preferably, the liquid crystal display device is applied to devices used at low-temperature conditions, such as onboard devices including automotive navigation systems.

The configurations of the liquid crystal display panel and the liquid crystal display device of the present invention are not especially limited by other components as long as they essentially include such components, and other configurations usually used in liquid crystal display panels and liquid crystal display devices may appropriately be applied.

The aforementioned modes may be employed in appropriate combination as long as the combination is not beyond the spirit of the present invention.

Advantageous Effects of Invention

The liquid crystal display panel and the liquid crystal display device of the present invention can provide a sufficiently high response speed and an excellent transmittance.

DESCRIPTION OF EMBODIMENTS

Figure 1:
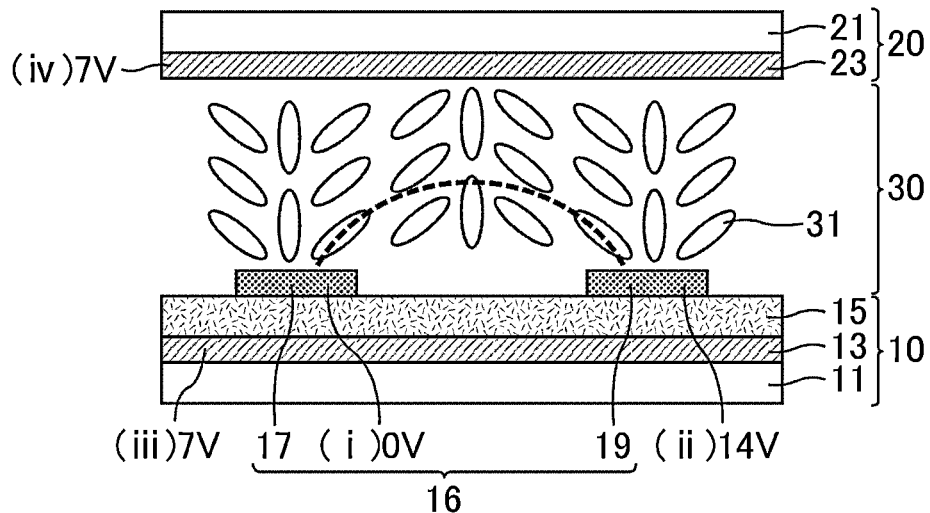
FIG. 1 is a schematic cross-sectional view showing a liquid crystal display panel of Reference Example 1 in the presence of a transverse electric field.

The present invention will be described in detail below in view of the following embodiments and drawings. The present invention is not limited to these embodiments. The term "pixel" herein also means a subpixel unless otherwise specified. The planar electrode may have, for example, dot ribs and/or slits as long as it is regarded as a planar electrode in the technical field of the present invention, but preferably substantially does not have alignment control structures. Of the pair of substrates sandwiching the liquid crystal layer, the display side substrate is also referred to as an upper substrate, and the substrate opposite the display side is also referred to as a lower substrate. Of the electrodes disposed on the substrates, the electrode on the display side is also referred to as an upper electrode, and the electrode on the opposite side of the display is also referred to as a lower electrode. Since the circuit board (second substrate) in each of the present embodiments has thin-film transistors (TFTs), the circuit board is also referred to as a TFT substrate or an array substrate. In the present embodiments, a voltage is applied to at least one electrode (pixel electrode) of the pair of comb-shaped electrodes by turning the TFTs to the ON state in both rising (transverse electric field) and falling (vertical electric field).

In each embodiment, the components or parts having the same function are given the same reference number, unless otherwise stated. Also in the drawings, the symbol (i) refers to the electric potential of one of the comb-shaped electrodes at the upper layer of the lower substrate, the symbol (ii) refers to the electric potential of the other of the comb-shaped electrodes at the upper layer of the lower substrate, the symbol (iii) refers to the electric potential of the planar electrode at the lower layer of the lower substrate, and the symbol (iv) refers to the electric potential of the planar electrode of the upper substrate.

Reference Example 1

Figure 2:
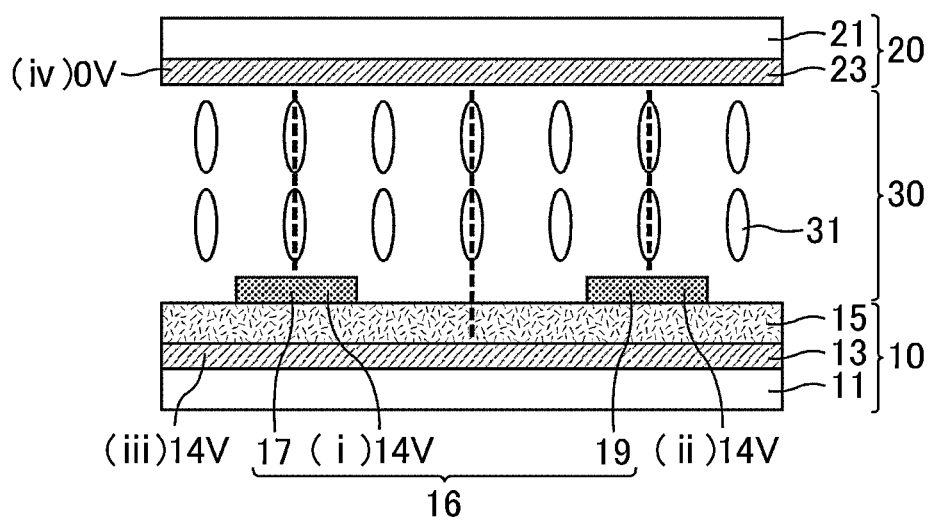
FIG. 2 is a schematic cross-sectional view showing the liquid crystal display panel of Reference Example 1 in the presence of a vertical electric field.

FIG. 1 is a schematic cross-sectional view showing the liquid crystal display panel of Reference Example 1 in the presence of a transverse electric field. FIG. 2 is a schematic cross-sectional view showing the liquid crystal display panel of Reference Example 1 in the presence of a vertical electric field. In each of FIG. 1 and FIG. 2, the dot line indicates the direction of an electric field generated. The liquid crystal display panel of Reference Example 1 has a vertical-alignment three-layered electrode structure (upper electrodes of the lower substrate, which serve as the second layer, are a pair of comb-shaped electrodes) using liquid crystal molecules 31 which are a positive liquid crystal. In rising, as shown in FIG. 1, a transverse electric field generated by a potential difference of 14 V between a pair of comb-shaped electrodes 16 (for example, a comb-shaped electrode 17 at an electric potential of 0 V and a comb-shaped electrode 19 at an electric potential of 14 V) rotates the liquid crystal molecules. In this case, substantially no potential difference is generated between the substrates (between a counter electrode 13 at an electric potential of 7 V and a counter electrode 23 at an electric potential of 7 V).

In falling, as shown in FIG. 2, a vertical electric field generated by a potential difference of 14 V between the substrates (for example, between each of the counter electrode 13, the comb-shaped electrode 17, and the comb-shaped electrode 19 at an electric potential of 14 V and the counter electrode 23 at an electric potential of 0 V) rotates the liquid crystal molecules. In this case, substantially no potential difference is generated between the pair of comb-shaped electrodes 16 (for example, consisting of the comb-shaped electrode 17 at an electric potential of 14 V and the comb-shaped electrode 19 at an electric potential of 14 V).

In both the rising and the falling, an electric field rotates the liquid crystal molecules to provide a high response speed. In other words, the transverse electric field between the pair of comb-shaped electrodes leads to the ON state to give a high transmittance in the rising, whereas the vertical electric field between the substrates leads to the ON state to give a high response speed in the falling. Further, the transverse electric field by comb driving also provides a high transmittance. Reference Example 1 and the following reference examples use a positive liquid crystal as the liquid crystal. Still, a negative liquid crystal may also be used instead of the positive liquid crystal. In the case of a negative liquid crystal, a potential difference between the pair of substrates aligns the liquid crystal molecules in the horizontal direction and a potential difference between the pair of comb-shaped electrodes aligns the liquid crystal molecules in the orthogonal direction. This provides an excellent transmittance, and an electric field rotates the liquid crystal molecules to provide a high response speed in both the rising and the falling. The electric potentials of the pair of comb-shaped electrodes are indicated by the symbols (i) and (ii), the electric potential of the planar electrode of the lower substrate is indicated by the symbol (iii), and the electric potential of the planar electrode of the upper substrate is indicated by the symbol (iv).

As shown in FIG. 1 and FIG. 2, the liquid crystal display panel of Reference Example 1 includes an array substrate 10, a liquid crystal layer 30, and an opposed substrate 20 (color filter substrate) stacked in the order set forth from the back side to the viewing side of the liquid crystal display panel. As shown in FIG. 2, the liquid crystal display panel of Reference Example 1 vertically aligns the liquid crystal molecules at a voltage lower than the threshold voltage. As shown in FIG. 1, an electric field generated between the upper electrodes 17 and 19 (the pair of comb-shaped electrodes) disposed on the glass substrate 11 (second substrate) tilts the liquid crystal molecules in the horizontal direction between the comb-shaped electrodes when a voltage difference between the comb-shaped electrodes is not lower than the threshold voltage, thereby controlling the amount of light transmitted. The planar lower electrode 13 (counter electrode 13) is disposed such that it sandwiches an insulating layer 15 with the upper electrodes 17 and 19 (the pair of comb-shaped electrodes 16). The insulating layer 15 may be formed from an oxide film (e.g. $SiO_2$), a nitride film (e.g. SiN), or an acrylic resin, for example, and these materials may be used in combination.

Although not shown in FIG. 1 and FIG. 2, a polarizing plate is disposed on each substrate at the side opposite to the liquid crystal layer. The polarizing plate may be a circularly polarizing plate or may be a linearly polarizing plate. An alignment film is disposed on the liquid crystal layer side of the each substrate. The alignment films each may be an organic alignment film or may be an inorganic alignment film as long as they align the liquid crystal molecules orthogonally to the film surface.

Figure 3:
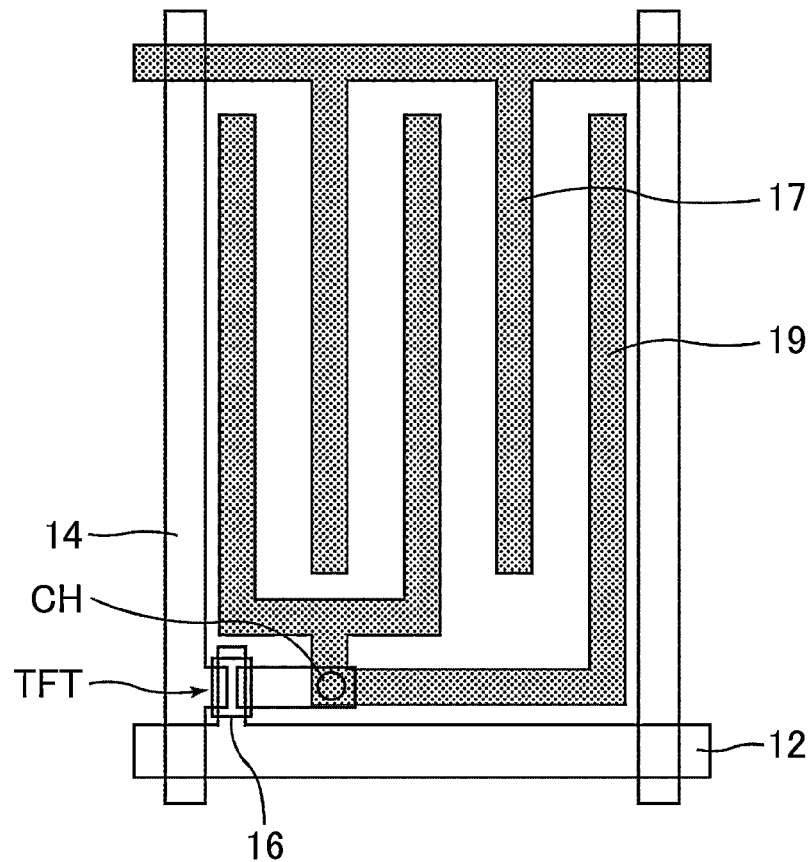
FIG. 3 is a schematic plan view showing a subpixel in the liquid crystal of Reference Example 1.

FIG. 3 is a schematic plan view showing a subpixel in the liquid crystal of Reference Example 1. A voltage supplied from an image signal line 14 is applied to the comb-shaped electrode 19, which drives the liquid crystal material, through a thin film transistor element (TFT) at the timing when the pixel is selected by a scanning signal line 12. The comb-shaped electrode 17 and the comb-shaped electrode 19 are formed on the same layer in the present embodiment and are preferably in a mode where they are formed on the same layer. Still, the comb-shaped electrodes may be formed on different layers as long as a voltage difference is generated between the comb-shaped electrodes to apply a transverse electric field and provides one effect of the present invention, that is, the effect of improving the transmittance. The comb-shaped electrode 19 is connected to a drain electrode that extends from the TFT through a contact hole CH. In FIG. 1 and FIG. 2, the counter electrodes 13 and 23 have a planar shape. Here, there may be commonly connected counter electrodes 13 corresponding to even-numbered lines and commonly connected counter electrodes 13 corresponding to odd-numbered lines of the gate bus lines. Such an electrode is also referred to as a planar electrode herein. The counter electrode 23 is commonly connected to all the pixels.

The electrode width L of each comb-shaped electrode in the present reference examples is 2.4 μm, and it is preferably 2 μm or greater, for example. The electrode gap S between the comb-shaped electrodes is 2.6 μm, and it is preferably 2 μm or greater, for example. The upper limit thereof is preferably 7 μm, for example.

The ratio (L/S) between the electrode gap S and the electrode width L is preferably 0.3 to 3, for example. The lower limit thereof is more preferably 0.4, whereas the upper limit thereof is more preferably 2.

The cell gap d is 5.4 μm. The cell gap is preferably 2 to 7 μm. The cell gap d (thickness of the liquid crystal layer) herein is preferably calculated by averaging the thicknesses throughout the liquid crystal layer in the liquid crystal display panel.

(Verification of Response Performance and Transmittance by Simulation)

Figure 4:
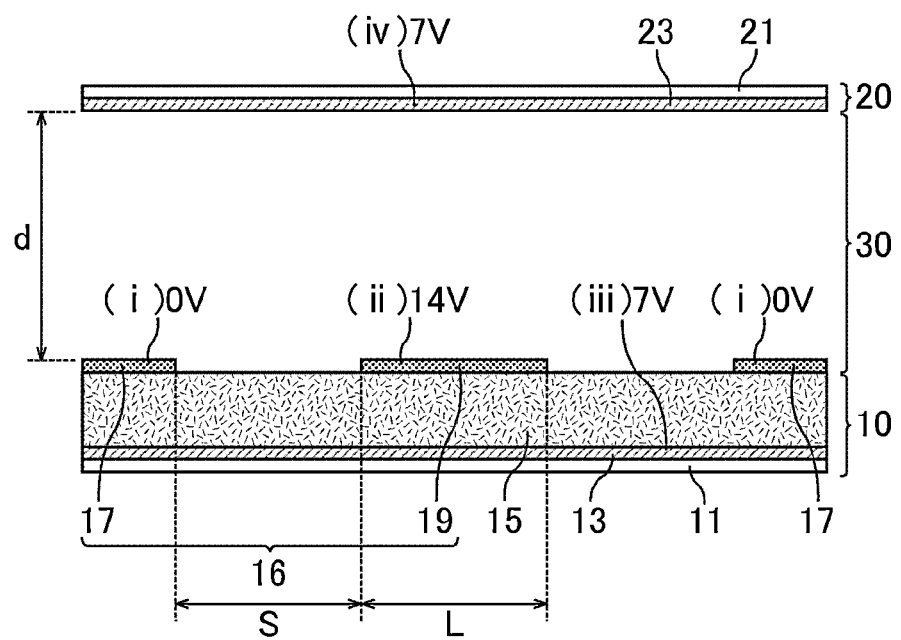
FIG. 4 is a schematic cross-sectional view showing the liquid crystal display panel of Reference Example 1 in the presence of a transverse electric field.

FIG. 4 is a schematic cross-sectional view showing the liquid crystal display panel of Reference Example 1 in the presence of a transverse electric field. The comb driving of Embodiment 1 generated a transverse electric field between the pair of comb-shaped electrodes 16 (e.g. the comb-shaped electrode 17 at an electric potential of 0 V and the comb-shaped electrode 19 at an electric potential of 14 V), and thereby rotated the liquid crystal molecules in a wide range between the pair of comb-shaped electrodes (FIG. 4, FIG. 5).

Figure 5:
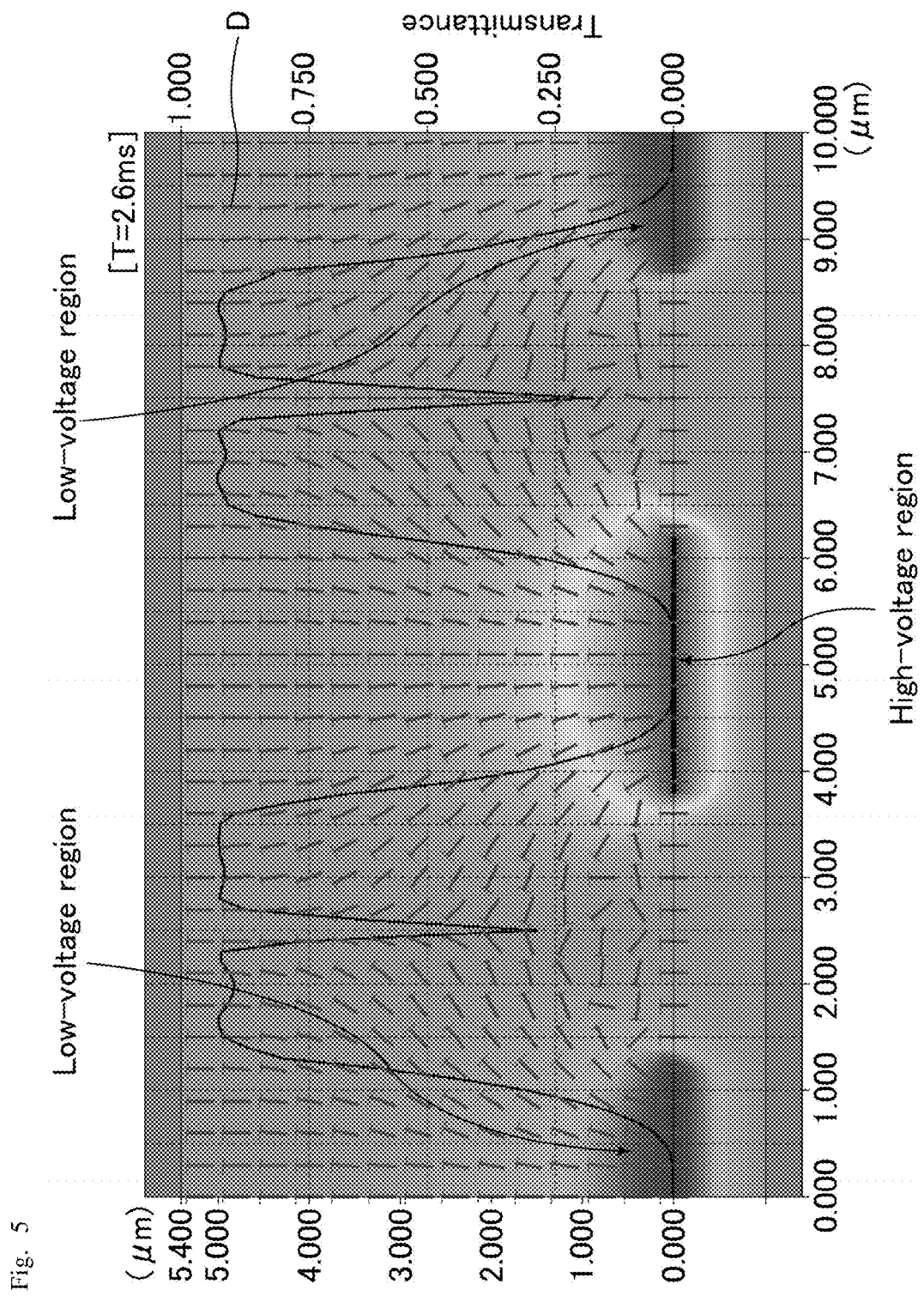
FIG. 5 shows simulation results relating to the liquid crystal display panel shown in FIG. 4.

FIG. 5 shows simulation results relating to the liquid crystal display panel shown in FIG. 4. FIG. 5 shows the simulation results of director D, electric field, and transmittance distribution at the timing of 2.2 ms after the rising (here, as described below regarding drawings such as graphs, the panel is not driven for 0.4 ms from the start). The graph drawn by a solid line indicates the transmittance. The director D indicates the alignment direction of the major axis of the liquid crystal molecules. The simulation was performed with a cell thickness of 5.4 μm and a comb gap of 2.6 μm.

Figure 6:
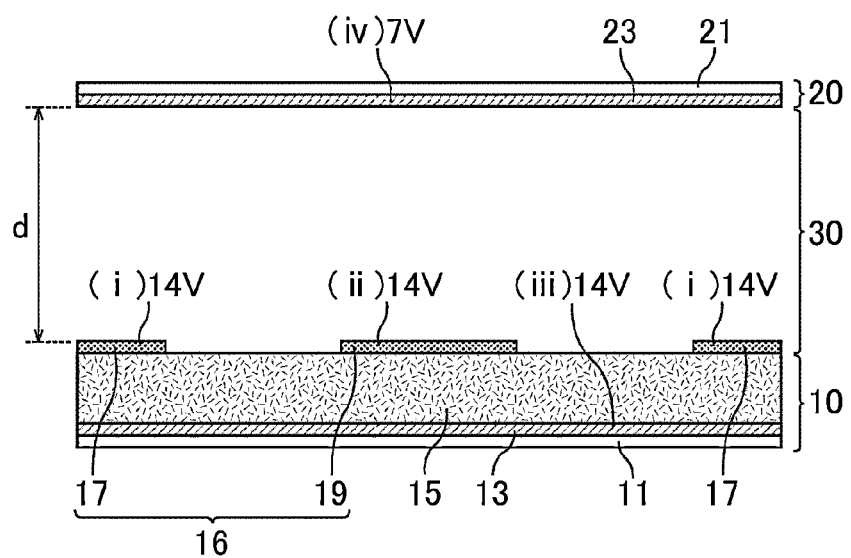
FIG. 6 is a schematic cross-sectional view showing the liquid crystal display panel of Reference Example 1 in the presence of a vertical electric field.
Figure 7:
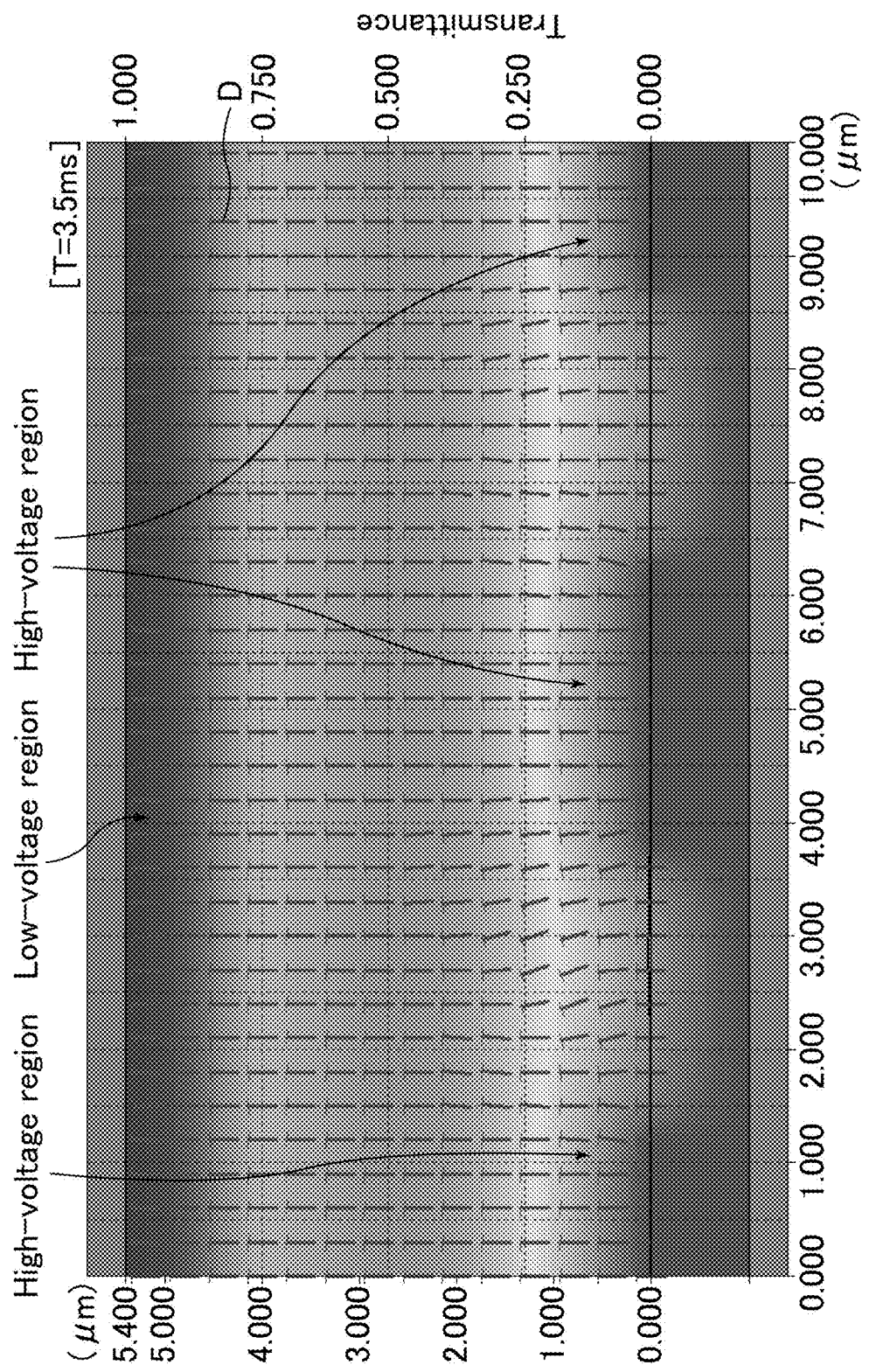
FIG. 7 shows simulation results relating to the liquid crystal display panel shown in FIG. 6.

In the case of generating a transverse electric field by comb driving in the liquid crystal display panel of Reference Example 1, the liquid crystal molecules could be rotated in a wide range between the comb-shaped electrodes, and a high transmittance was achieved (a simulated transmittance of 18.6% (FIG. 8), and a measured transmittance of 17.7% (FIG. 9) as mentioned later). In contrast, in the later-described Comparative Example 5 (using FFS driving of the prior art document), a sufficient transmittance was not obtained. FIG. 6 is a schematic cross-sectional view showing the liquid crystal display panel of Reference Example 1 in the presence of a vertical electric field. A vertical electric field generated at a potential difference between the substrates of 7 V (e.g. between each of the counter electrode 13, the comb-shaped electrode 17, and the comb-shaped electrode 19 at an electric potential of 14 V and the counter electrode 23 at an electric potential of 7 V) rotates the liquid crystal molecules. FIG. 7 shows simulation results relating to the liquid crystal display panel shown in FIG. 6. FIG. 7 shows the simulation results of director D, electric field, and transmittance distribution at the timing of 3.5 ms that is after the end point (2.8 ms) of the rising period.

Figure 8:
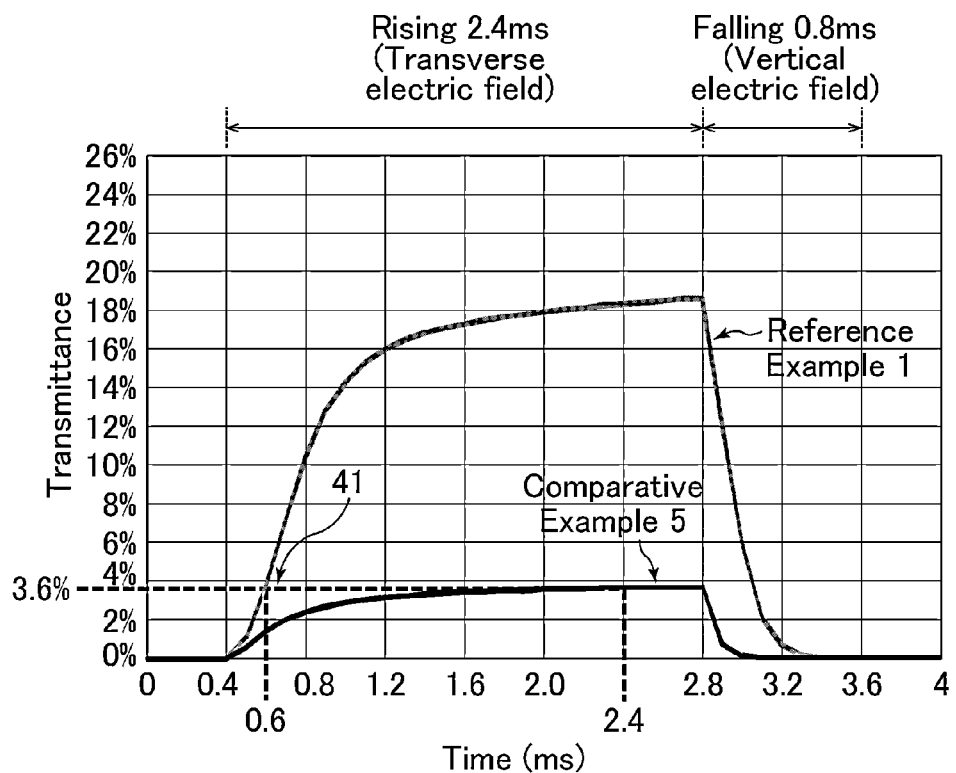
FIG. 8 is a graph showing the comparison between the response waveforms in the simulations of comb driving and FFS driving.

FIG. 8 is a graph showing the comparison between the response waveforms in the simulations of comb driving and FFS driving. The rising period (period of applying a transverse electric field) was 2.4 ms and the falling period (period of applying a vertical electric field) was 0.8 ms. No driving occurred in the first 0.4 ms. FIG. 8 compares the comb driving (Reference Example 1) and FFS driving (Comparative Example 1) to be mentioned later. The simulation was performed with a cell thickness of 5.4 μm and an electrode gap between the pair of comb-shaped electrodes of 2.6 μm.

The response speed may presumably be considered as follows. The transmittance (18.6%) provided by the comb driving in Reference Example 1 was higher than that (3.6%) achieved by the FFS driving in Comparative Example 5. Thus, the comb driving in Reference Example 1 provided a transmittance of 3.6% at a higher response speed than FFS driving by the use of overdrive. In other words, the response time in rising was shortened by applying a voltage at least higher than a rated voltage required for a transmittance of 3.6% by comb driving to cause rapid response of the liquid crystal, and then decreasing the voltage to the rated voltage at the timing when the transmittance reached a desired value. For example, in FIG. 8, the voltage was decreased to the rated voltage at a timing 41 (0.6 ms) to shorten the response time in rising. Falling from the same transmittance took the same response time.

(Verification of Response Performance and Transmittance by Actual Measurement)

Figure 9:
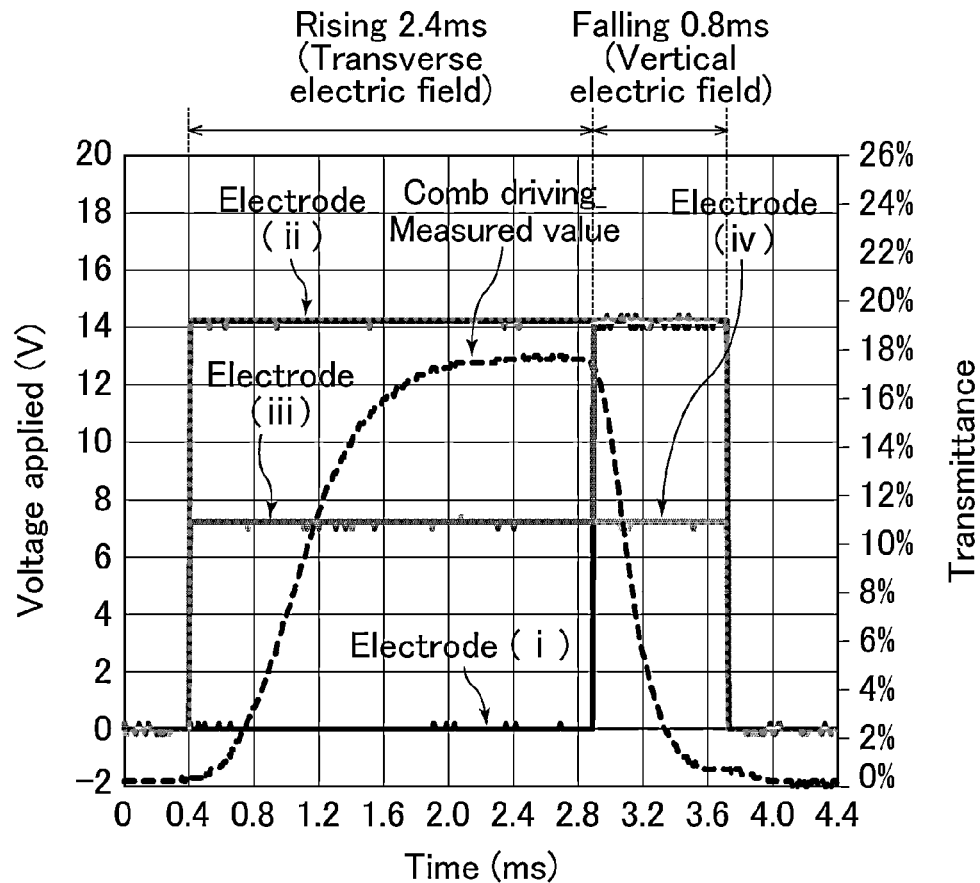
FIG. 9 is a graph showing the measured drive response waveform and the rectangular waves applied to the respective electrodes in Reference Example 1.

FIG. 9 is a graph showing the measured drive response waveform and the rectangular waves applied to the respective electrodes in Reference Example 1. Similarly to the above simulation, the cell thickness was 5.4 µm and the electrode gap between the pair of comb-shaped electrodes was 2.6 µm. The measurement temperature was 25° C.

In the rising, as shown in FIG. 4, a voltage was applied to each electrode and a transverse electric field was applied to the liquid crystal molecules. In the falling, as shown in FIG. 6, a voltage was applied to each electrode and a vertical electric field was applied to the liquid crystal molecules. In other words, the rising period was 2.4 ms of comb driving (Reference Example 1) between the pair of comb-shaped electrodes, whereas the falling period was 0.8 ms of vertical-electric-field driving between each of the pair of comb-shaped electrodes, the lower electrode of the lower substrate, and the counter electrode of the upper substrate (between each of the counter electrode 13, the comb-shaped electrode 17, and the comb-shaped electrode 19 and the counter electrode 23 in FIG. 2) (see FIG. 9 for the waveforms applied to the respective electrodes).

The actual measurement gave a maximum transmittance of 17.7% (simulated transmittance: 18.6%) in Reference Example 1, and thus a higher transmittance than in Comparative Example 5 (simulated transmittance: 3.6%) to be mentioned later was provided. In the rising, the response speed of 0.9 ms was provided at a transmittance of 10 to 90% (maximum transmittance was defined as 100%), whereas in the falling, the response speed of 0.4 ms was provided at a transmittance of 90 to 10% (maximum transmittance was defined as 100%). Thus, both the rising and the falling provided a higher response speed.

To summarize the above, the response speed is as shown in FIG. 9 in the mode in which the liquid crystal molecules are rotated by an electric field in both rising and falling to achieve high response speed (the mode is also referred to as the "ON-ON mode"). A voltage is applied to each electrode as shown in FIG. 4 and FIG. 6, and the liquid crystal molecules are driven such that the time for transverse electric field application is 2.4 ms and the time for vertical electric field application is 0.8 ms. These response waveforms show that the response speed in rising is very high.

The present embodiments described below employ a pixel structure which features a further increased response speed in rising. That is, usually, both a TFT substrate and an opposed substrate vertically align liquid crystal molecules uniformly in a plane. In the present embodiments, however, the liquid crystal molecules are initially aligned to be readily aligned in the white display state, so that the response speed is further increased.

Figure 10:
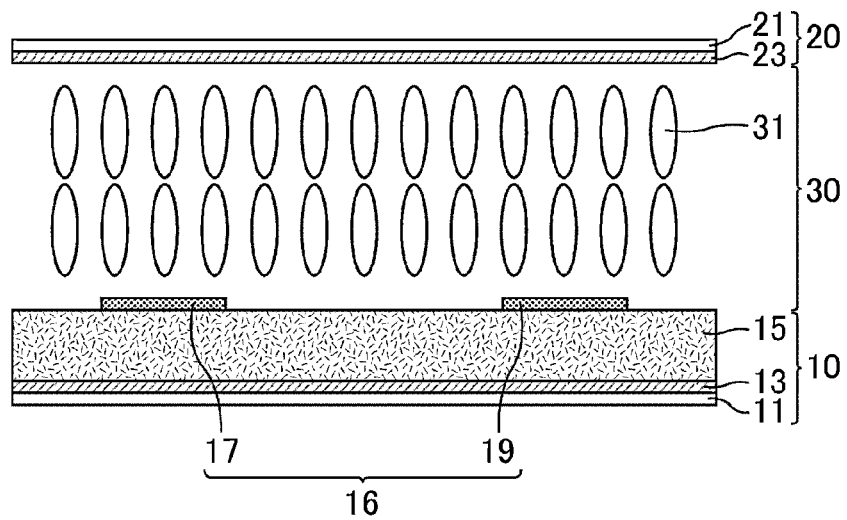
FIG. 10 is a schematic cross-sectional view showing alignment of liquid crystal molecules in black display of the liquid crystal display panel of Reference Example 1.
Figure 11:
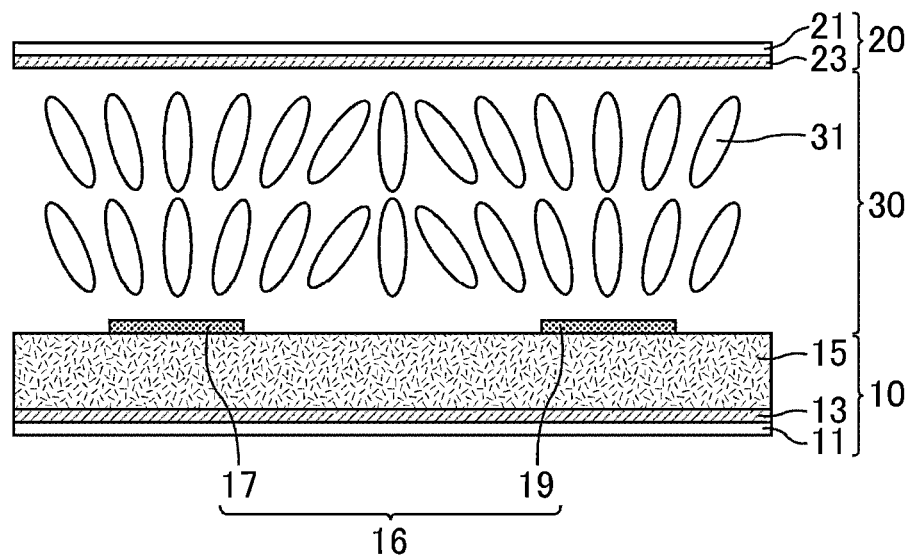
FIG. 11 is a schematic cross-sectional view showing alignment of liquid crystal molecules in white display of the liquid crystal display panel of Reference Example 1.
Figure 12:
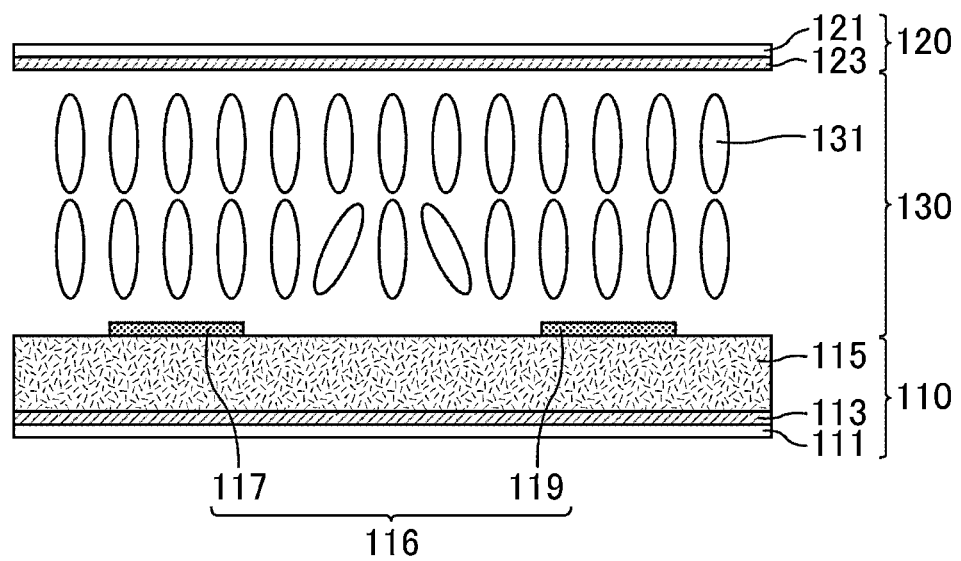
FIG. 12 is a schematic cross-sectional view showing alignment of liquid crystal molecules in black display of the liquid crystal display panel of the present embodiments.
Figure 13:
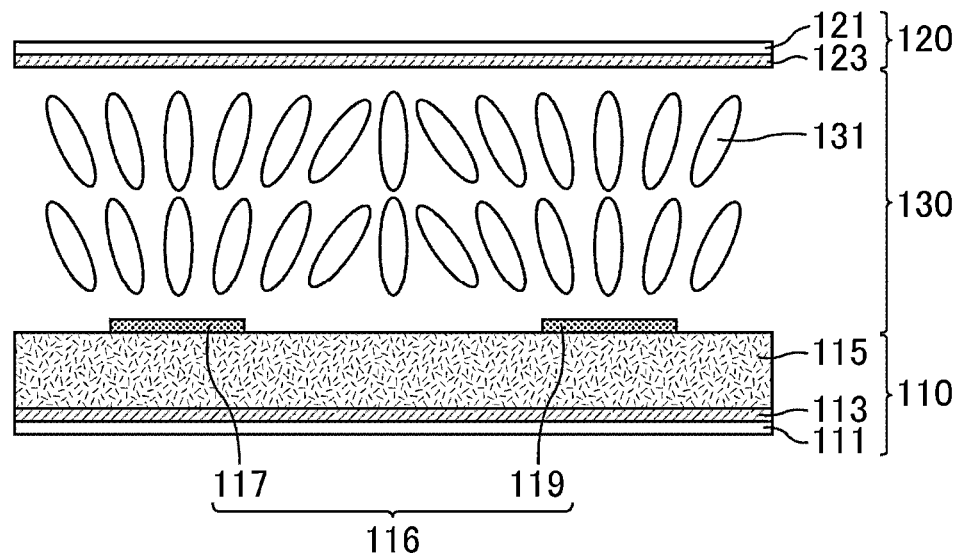
FIG. 13 is a schematic cross-sectional view showing alignment of liquid crystal molecules in the display mode changed to white display in the liquid crystal display panel of the present embodiments.

FIG. 10 is a schematic cross-sectional view showing alignment of liquid crystal molecules 31 in black display of the liquid crystal display panel of Reference Example 1. FIG. 11 is a schematic cross-sectional view showing alignment of the liquid crystal molecules 31 in the liquid crystal display panel of Reference Example 1 when the display mode is changed to white display. FIG. 12 is a schematic cross-sectional view showing alignment of liquid crystal molecules 131 in black display of the liquid crystal display panel of any of the present embodiments. FIG. 13 is a schematic cross-sectional view showing alignment of the liquid crystal molecules 131 in white display of the liquid crystal display panel of any of the present embodiments. The change in the state from FIG. 10 to FIG. 11 is fast, and the change in the state from FIG. 12 to FIG. 13 is even faster than that change. Although not illustrated, the present embodiments exhibit a better transmittance in white display than the reference examples. The other configurations in the present embodiments are the same as those described for Reference Example 1. The other reference numbers in FIG. 12 and FIG. 13 are the same as those described for Reference Example 1 except that a numeral "1" was added as the hundred's digit.

Figure 14:
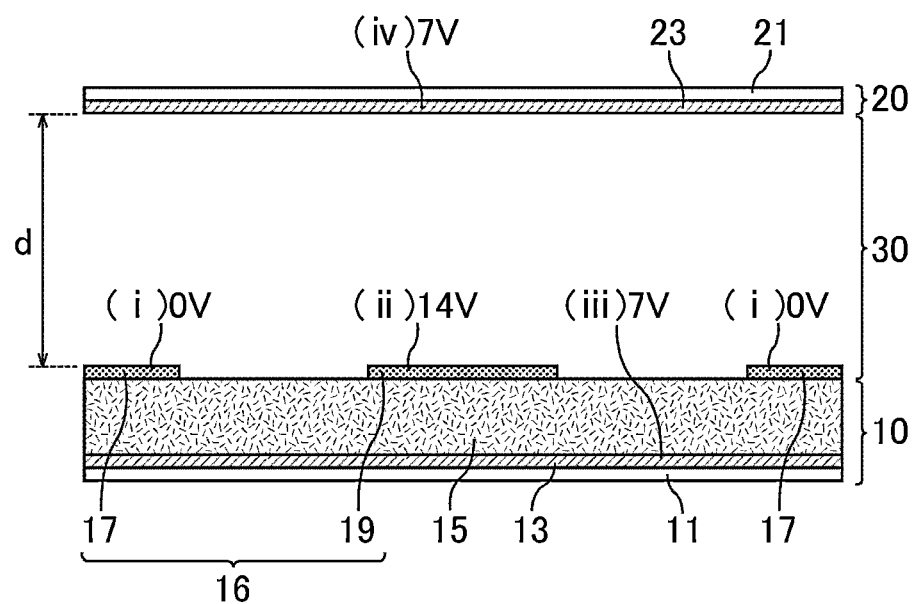
FIG. 14 is a schematic cross-sectional view of a liquid crystal display panel showing an example of voltage application setting in the present embodiments.

FIG. 14 is a schematic cross-sectional view of a liquid crystal display panel showing one example of voltage application setting in the present embodiments.

Figure 21:
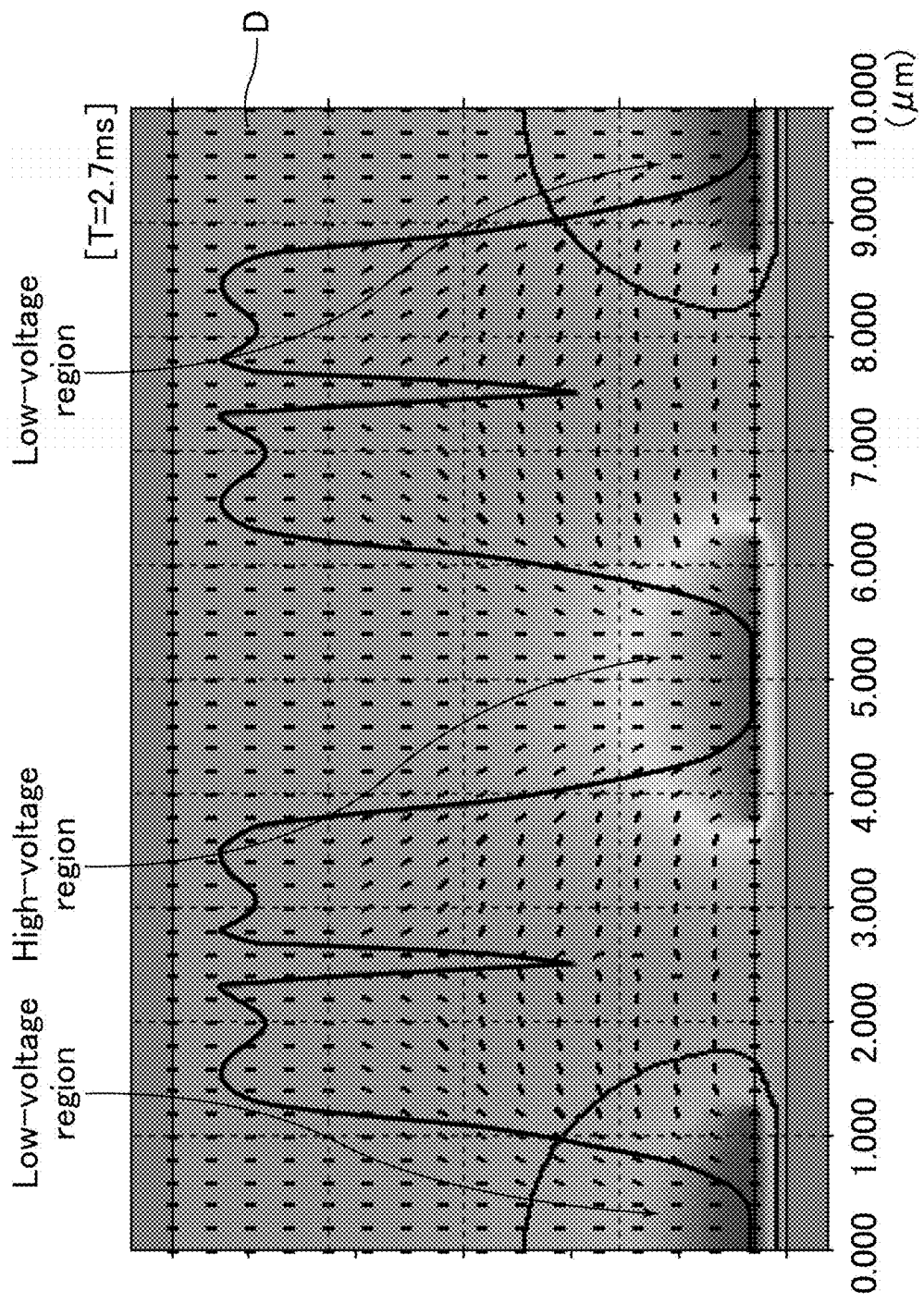
FIG. 21 shows simulation results relating to the liquid crystal display panel of Comparative Example 1.

In the mode in which a high response speed is achieved by rotating liquid crystal molecules by an electric field in both rising and falling, a voltage is applied as shown in FIG. 14, and alignment distribution under voltage is as shown in FIG. 21. This results in a dark line appearing at the center of each slit in a plan view of the main faces of the substrates.

When the liquid crystal molecules are initially aligned to be readily aligned in the white display state, that is to say when liquid crystal molecules present on the substrate side with the comb-shaped electrodes provided thereon are inclined from the normal direction to the substrates, the response speed is increased and the transmittance is also increased. Examples of the method of providing such initial alignment (pretilt-providing method) include (i) forming a recess in the center portion of each slit in the insulating layer, (ii) forming a recess in the insulating layer between the upper electrodes, (iii) PSA under a voltage providing the desired alignment distribution, and (iv) FPA. The method is described in detail below.

Embodiments 1, 2

Figure 15:
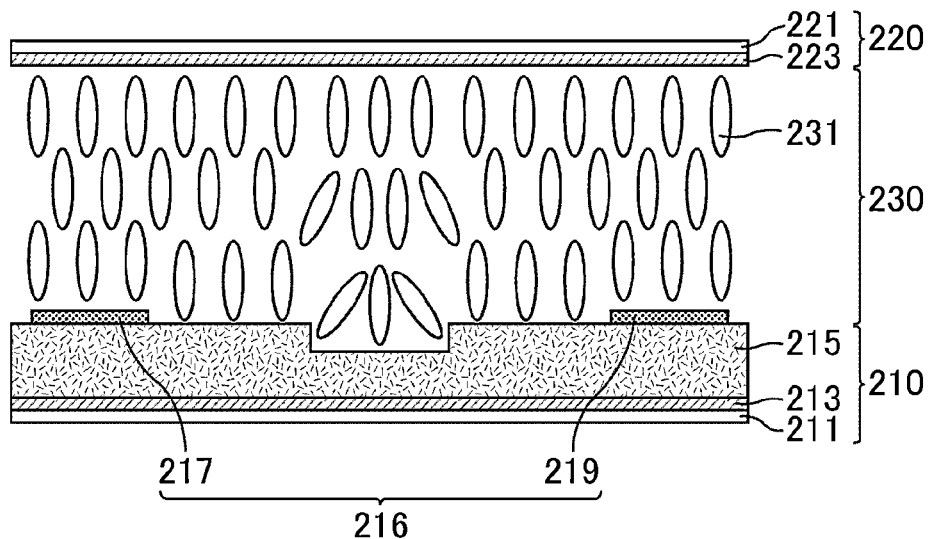
FIG. 15 is a schematic cross-sectional view showing a black display state in liquid crystal display panels of Embodiment 1 and Embodiment 2.

FIG. 15 is a schematic cross-sectional view showing a black display state in liquid crystal display panels of Embodiment 1 and Embodiment 2. In Embodiment 1 and Embodiment 2, the method (i) of forming a recess in the center portion of each slit in the insulating layer (forming a recess at the center of each slit in the insulating layer between the upper layer and lower layer electrodes) is used. The cell thickness in Embodiment 1 is 5.4 µm, and the cell thickness in Embodiment 2 is 3.4 µm.

Since the liquid crystal display panel of the present invention includes a lower substrate which basically has a multi-layer electrode structure (e.g., bilayer structure), the panel includes an electrical resistance layer such as an insulating layer between the upper electrode and the lower electrode. In this insulating layer, a recess is formed at a part of the center portion (middle portion) between the pair of comb-shaped electrodes which constitute the upper electrode having a comb shape. Such a recess produces a portion where the liquid crystal molecules are tilted in the slit between the electrodes as shown in FIG. 15.

A recess is formed in the center portion because a dark line will appear in this portion. Changing the initial alignment makes such a dark line thin, increasing the transmittance and the response speed (see the verification of the effects of Embodiment 1 and Embodiment 2 described below).

The cross-sectional shape of a recess may be rectangular (quadrangular) as shown in FIG. 15, or may be round. The plan shape (not shown) may also be rectangular or round-chamfered rectangular.

The size is preferably determined such that the recess (recessed portion in the insulating layer) overlaps the dark line in a plan view of the main faces of the substrates. For example, the recess preferably overlaps a portion in the range of ±0.5 μm from the dark line. More preferably, the recess overlaps the entire portion in the range of ±0.5 μm from the dark line. The width of the recess is preferably 0.3 μm to 3 μm, particularly preferably about 1 μm.

A liquid crystal display device including the liquid crystal display panel of the Embodiment 1 or Embodiment 2 can include the components provided to a common liquid crystal display device (e.g. light source). The same applies to the embodiments described later.

Embodiment 3, 4

Figure 16:
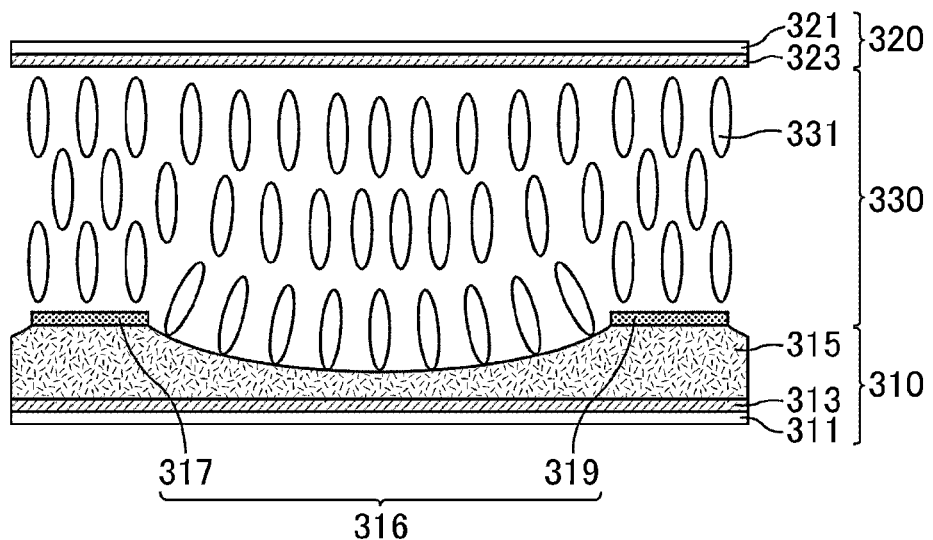
FIG. 16 is a schematic cross-sectional view showing a black display state in liquid crystal display panels of Embodiment 3 and Embodiment 4.

FIG. 16 is a schematic cross-sectional view showing a black display state in liquid crystal display panels of Embodiment 3 and Embodiment 4. In Embodiment 3 and Embodiment 4, the method (ii) of forming recesses in the insulating layer between the upper electrodes is used. The cell thickness in Embodiment 3 is 5.4 μm, and the cell thickness in Embodiment 4 is 3.4 μm.

Forming a recess in the substantially entire insulating layer constituting the slit between the comb-shaped upper electrodes provides initial alignment widely between the pair of comb-shaped electrodes (within the slit). In this case, the initial alignment is readily changeable to the alignment in white display, and thus this structure increases the response speed and the transmittance (see the verification of the effects of Embodiment 3 and Embodiment 4 described below). In Embodiments 1 to 4, a recess of the desired shape can be formed at a desired position by, for example, a halftone process using a patterning mask for the portion to be recessed in forming an insulating layer.

Embodiment 5

Figure 17:
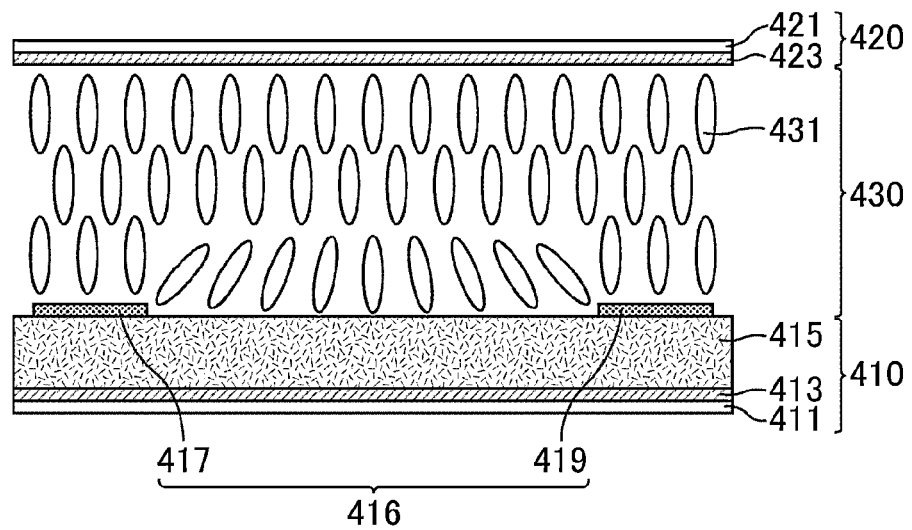
FIG. 17 is a schematic cross-sectional view showing a black display state in a liquid crystal display panel of Embodiment 5.

FIG. 17 is a schematic cross-sectional view showing a black display state in a liquid crystal display panel of Embodiment 5.

In Embodiment 5, monomers are dispersed in a liquid crystal. The liquid crystal is irradiated with light while a voltage giving the desired alignment to the liquid crystal (i.e. voltage generating a transverse electric field) is applied to the liquid crystal for photopolymerization of the monomers dispersed in the liquid crystal layer, so that a polymer is formed on the alignment film surface. This polymer fixes the initial alignment (pretilt) of the liquid crystal on the alignment film surface. This technique is also referred to as a polymer sustained alignment (PSA) technique. The polymer on the alignment film surface is not shown in FIG. 17.

The method used in Embodiment 3 and Embodiment 4 changes the initial alignment using the surface shape of the insulating layer. The PSA technique, however, achieves the same effect as that of Embodiment 3 and Embodiment 4 with the surface of the insulating layer flat. The reference numbers in FIG. 15 to FIG. 17 are the same as those described in Reference Example 1 except that the hundred's digit is changed.

(Verification of the Effect of Embodiment 1)

Simulation was performed under evaluation conditions of a cell thickness of 5.4 μm and an electrode gap of 2.0 μm. The results of the simulation are shown below.

Figure 18:
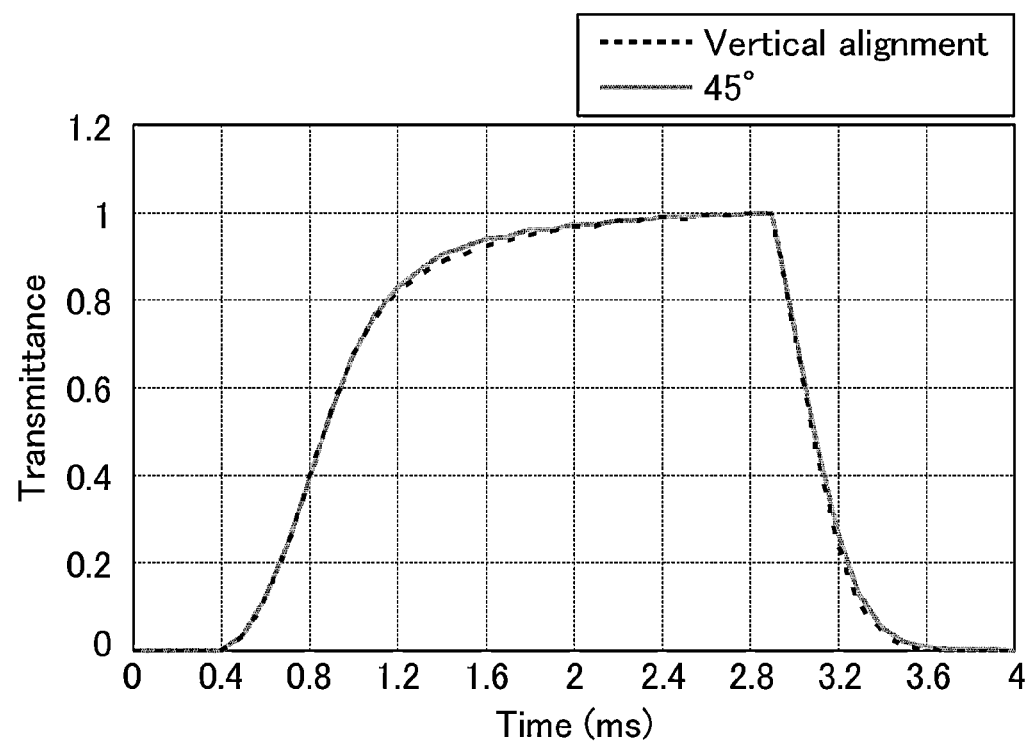
FIG. 18 is a graph showing response waveforms in liquid crystal display panels of Embodiment 1 and Comparative Example 1.
Figure 19:
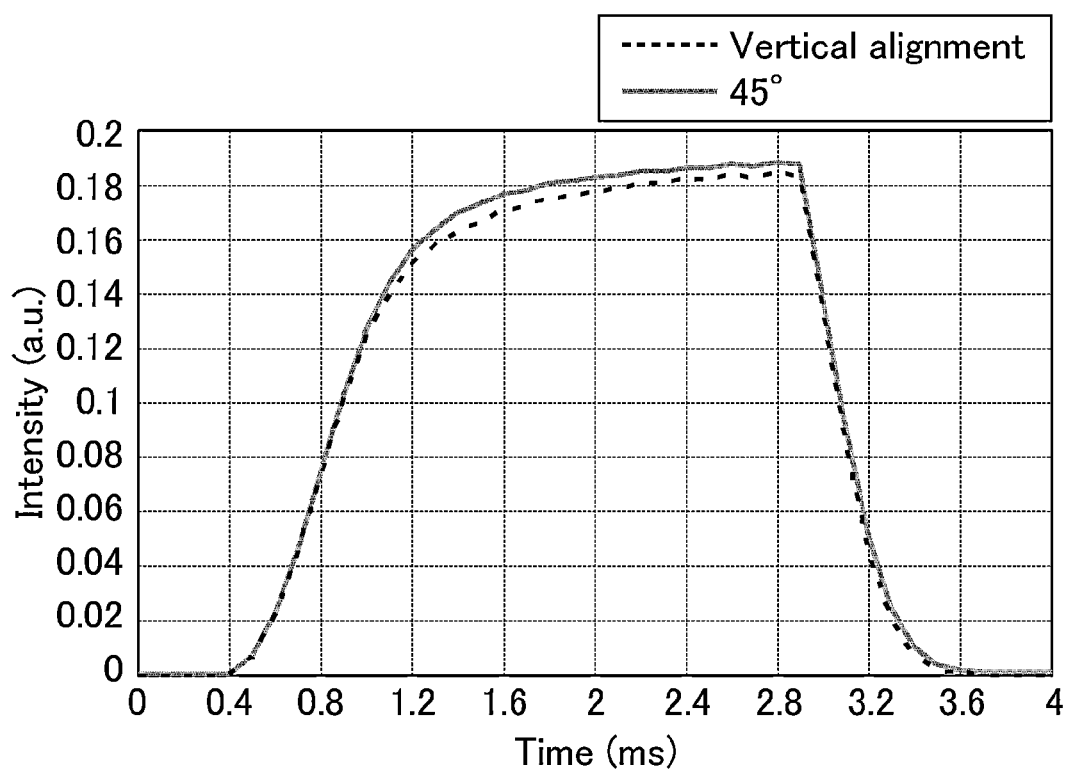
FIG. 19 is another graph showing response waveforms in the liquid crystal display panels of Embodiment 1 and Comparative Example 1.

FIG. 18 and FIG. 19 each are a graph showing the response waveforms of the liquid crystal display panels of Embodiment 1 and Comparative Example 1. FIG. 18 and FIG. 19 show the response waveforms when the pretilt angle of the liquid crystal molecules on the TFT substrate side was changed. The optical response waveforms of Embodiment 1 were obtained by applying the same respective voltages as those shown in the above FIG. 4 and FIG. 6 to the electrodes, and thereby inclining the liquid crystal molecules at the center of the portion between the comb-shaped electrodes on the TFT substrate side at a pretilt angle of 45° from the normal direction to the substrates. The term "pretilt" herein means that the initial alignment of liquid crystal molecules when no voltage is applied is inclined from the normal direction to the substrates. The term "pretilt angle" herein refers to the angle at which the liquid crystal molecules are tilted from the normal direction to the substrates when no voltage is applied. The configuration in Comparative Example 1 is the same as that in Embodiment 1 except that the liquid crystal molecules at the center of the portion between the comb-shaped electrodes on the TFT substrate side are vertically aligned. The graph of FIG. 18 shows the transmittance standardized at the light intensity in white display. The graph of FIG. 19 shows the response waveform (response waveform of light intensity) before the standardization.

The response speed in the change in the transmittance of 10% to 90% was 1.0 ms without pretilt (vertical alignment), whereas the response speed was 0.9 ms with pretilt (45° from the normal direction to the main faces of the substrates), which achieves a high response speed. The light intensity also increased by 3% without pretilt (vertical alignment) compared to the case with pretilt (45° from the normal direction to the main faces of the substrates).

Figure 20:
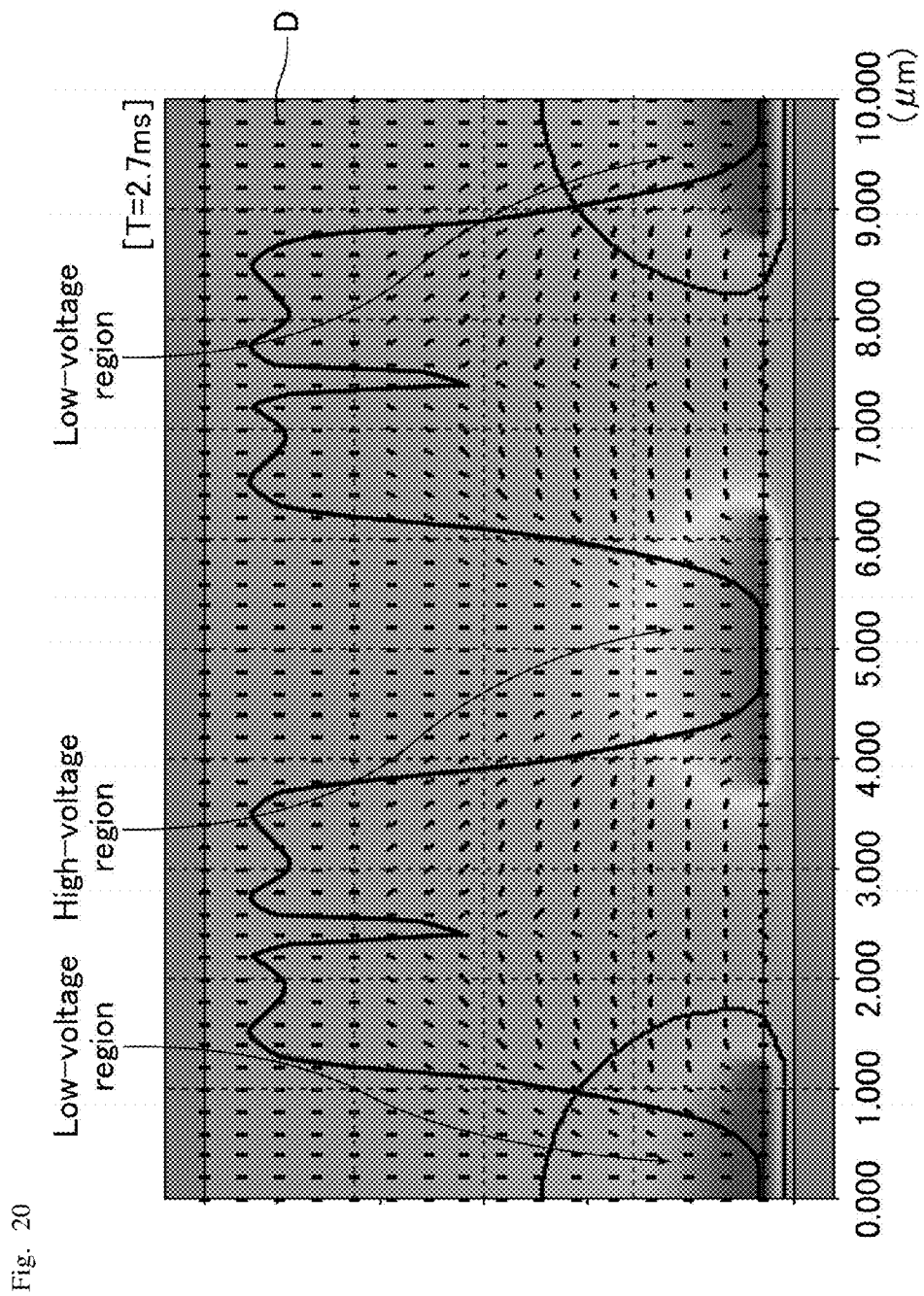
FIG. 20 shows simulation results relating to the liquid crystal display panel of Embodiment 1.

FIG. 20 shows simulation results relating to the liquid crystal display panel of Embodiment 1, including the alignment distribution and in-plane transmittance distribution in white display. FIG. 21 shows simulation results relating to the liquid crystal display panel of Comparative Example 1, including the alignment distribution and in-plane transmittance distribution in white display. The symbol "D" indicates the direction of liquid crystal molecules.

The response speed increased in Embodiment 1 because the liquid crystal molecules provided with pretilt were more easily changed to the alignment state in white display. Also, the transmittance increased in Embodiment 1 because the liquid crystal molecules between the comb-shaped electrodes were more easily tilted by the influence of the TFT substrate interface than in Comparative Example 1 where the liquid crystal molecules were vertically aligned without moving. As a result, the dark line appearing between the electrodes is thinned to increase the transmittance.

(Verification of the Effect of Embodiment 2)

Simulation was performed under evaluation conditions of a cell thickness of 3.4 μm and an electrode gap of 2.0 μm. The results of the simulation are shown below.

Figure 22:
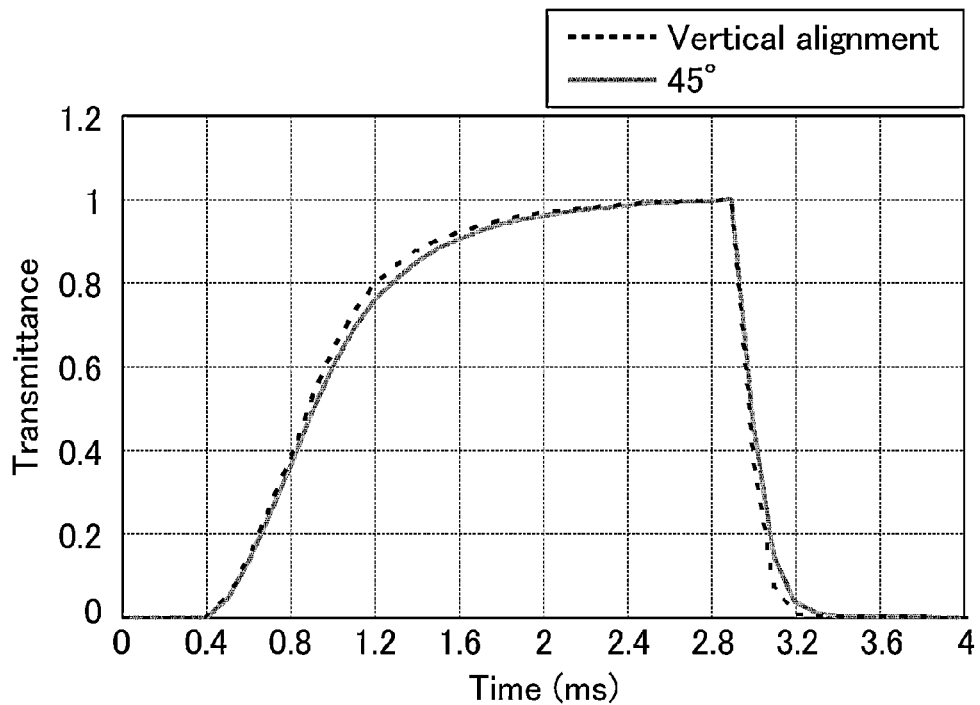
FIG. 22 is a graph showing response waveforms in liquid crystal display panels of Embodiment 2 and Comparative Example 2.
Figure 23:
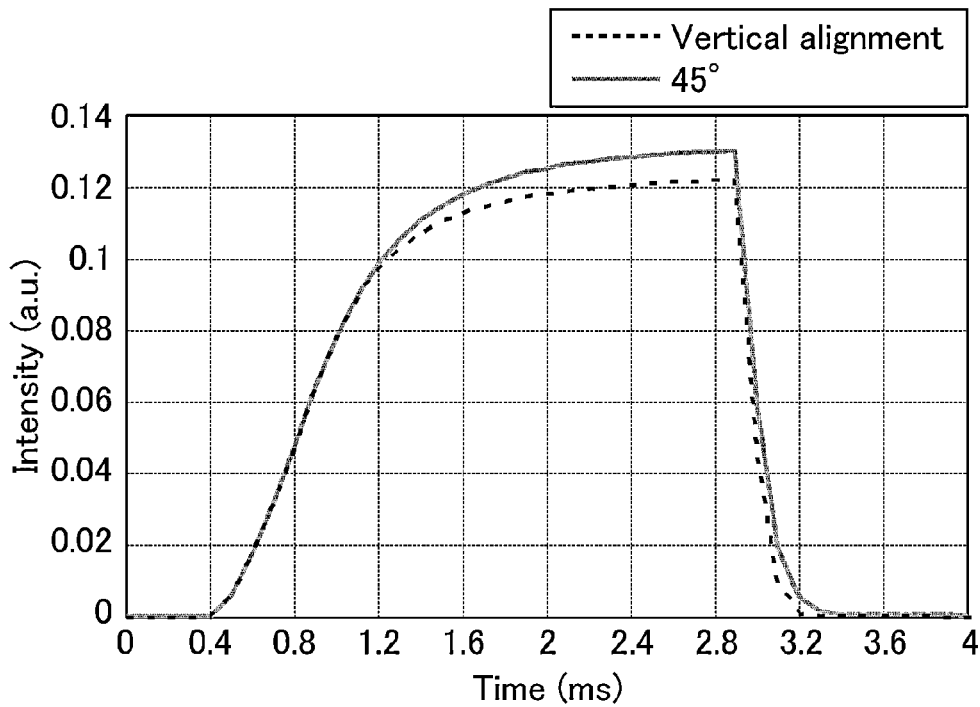
FIG. 23 is another graph showing response waveforms in the liquid crystal display panels of Embodiment 2 and Comparative Example 2.

FIG. 22 and FIG. 23 each are a graph showing the response waveforms of the liquid crystal display panels of Embodiment 2 and Comparative Example 2. FIG. 22 and FIG. 23 show the response waveforms when the pretilt angle of the liquid crystal molecules on the TFT substrate side was changed. The configuration in Embodiment 2 is the same as that in Embodiment 1 except that the cell thickness (thickness of the liquid crystal layer) was changed from 5.4 μm to 3.4 μm. The configuration in Comparative Example 2 is the same as that in Comparative Example 1 except that the thickness of the liquid crystal layer was changed from 5.4 μm to 3.4 μm. The graph of FIG. 22 shows the transmittance standardized at the light intensity in white display, and the graph of FIG. 23 shows the response waveform (response waveform of light intensity) before the standardization.

The pretilt-providing structure in the present invention does not always improve both the response speed and the transmittance. When the cell thickness was 3.4 μm, the response speed in the change in the transmittance of 10% to 90% was 1.0 ms without pretilt (vertical alignment) whereas the response speed was as low as 1.1 ms with pretilt (45° from the normal direction to the main faces of the substrates).

In contrast, the light intensity increased by 7% with pretilt (45° from the normal direction to the main faces of the substrates) compared to the case without pretilt (vertical alignment). There is a clear difference between the change in the characteristics with a cell thickness of 5.4 μm in Embodiment 1 and Comparative Example 1 and the change in the characteristic with a cell thickness of 3.4 μm in Embodiment 2 and Comparative Example 2. With a thickness of 3.4 μm, the response speed decreases when the pretilt angle is inclined from the normal direction to the substrates, but the transmittance increases at a better ratio than that in the case with a thickness of 5.4 μm. That is, the pretilt-providing structure can give a significantly excellent response speed, a significantly excellent transmittance, or both a significantly excellent response speed and a significantly excellent transmittance.

Figure 24:
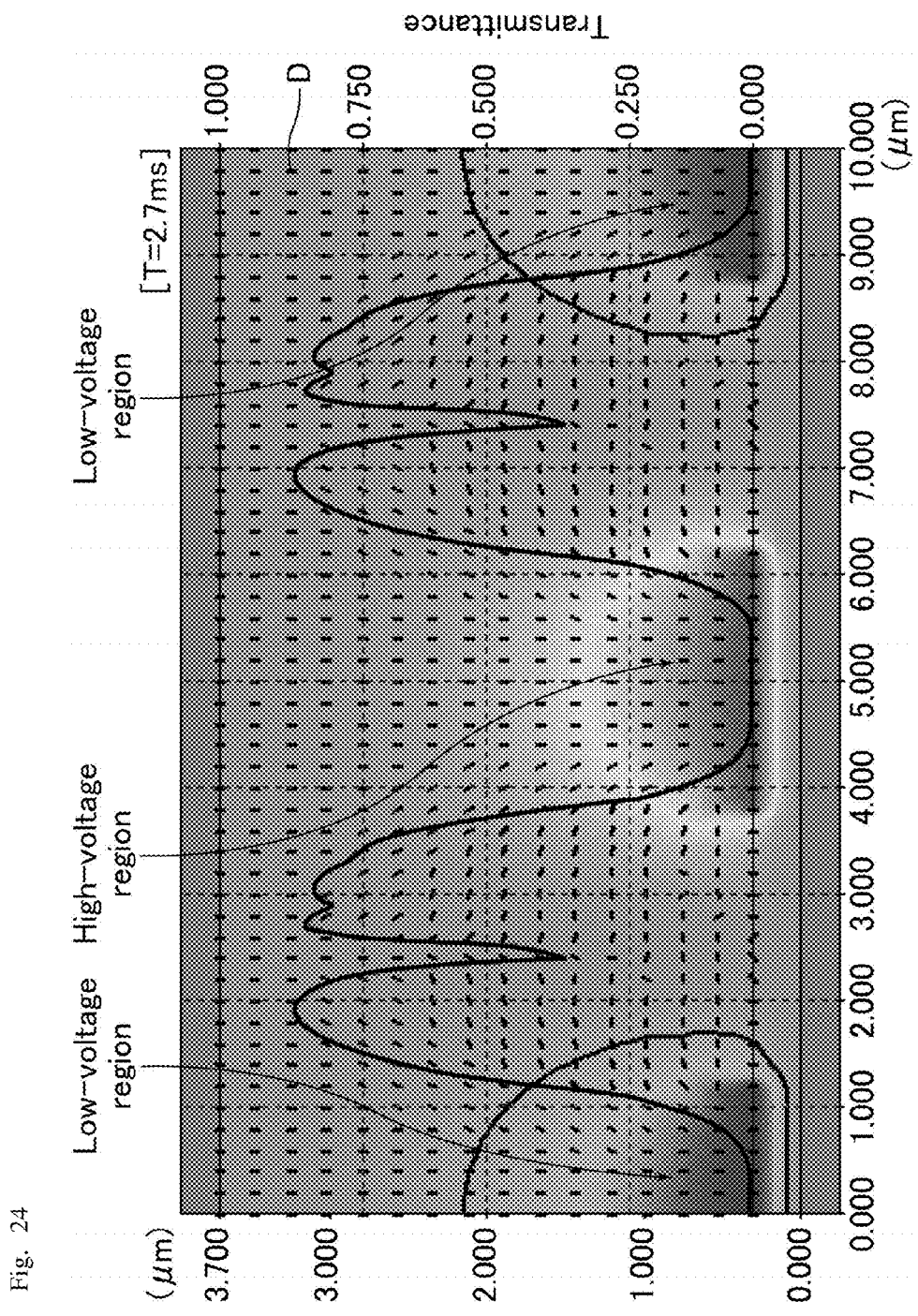
FIG. 24 shows simulation results relating to the liquid crystal display panel of Embodiment 2.
Figure 25:
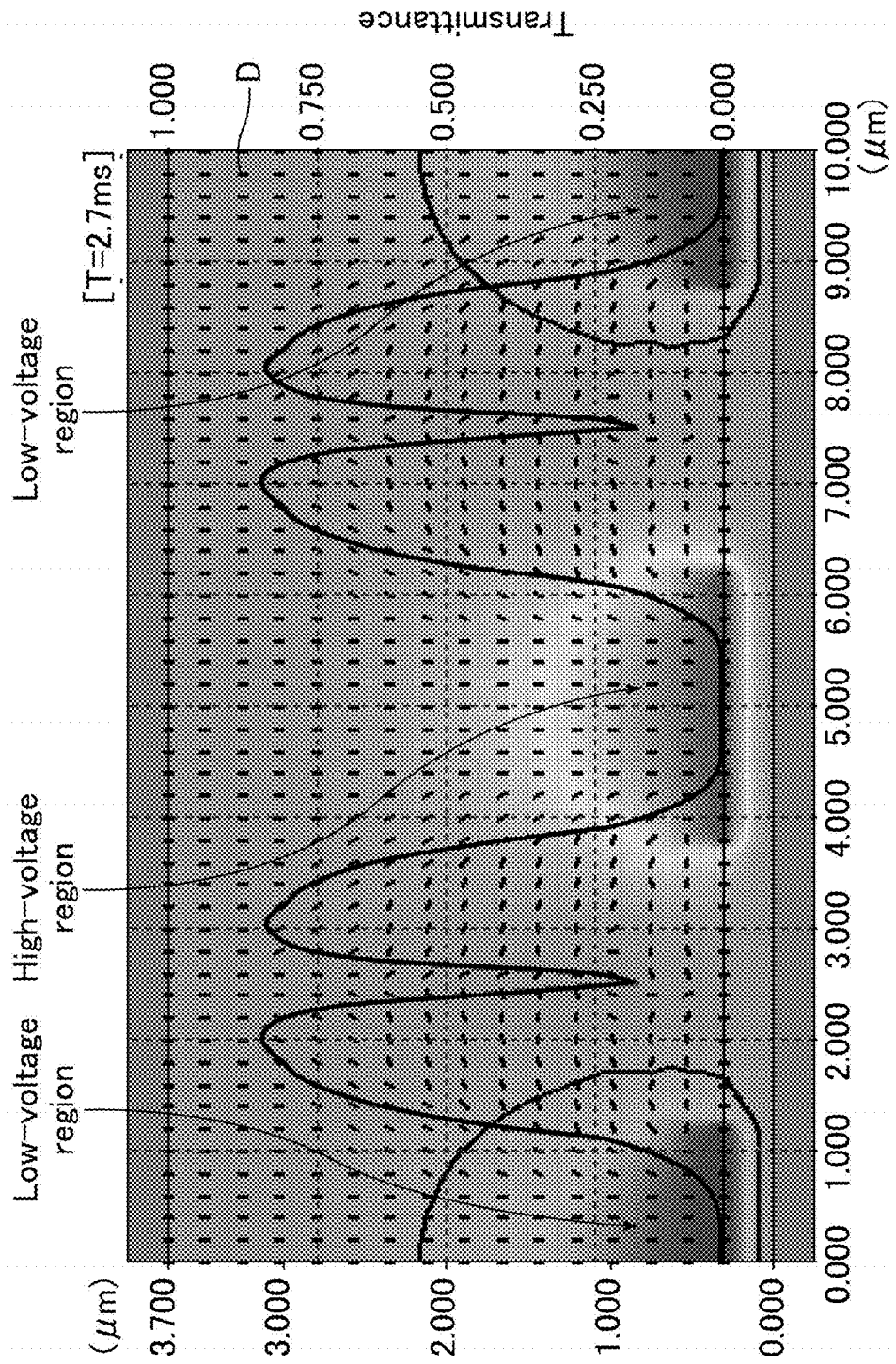
FIG. 25 shows simulation results relating to the liquid crystal display panel of Comparative Example 2.

FIG. 24 shows simulation results relating to the liquid crystal display panel of Embodiment 2, including the alignment distribution and in-plane transmittance distribution in white display. FIG. 25 shows simulation results relating to the liquid crystal display panel of Comparative Example 2, including the alignment distribution and in-plane transmittance distribution in white display. The symbol "D" indicates the direction of liquid crystal molecules.

The response speed slightly decreased in Embodiment 2 because the transmittance in the case with pretilt (45° from the normal direction to the main faces of the substrates) significantly increased, which led to a decrease in the apparent response speed. Also, the transmittance increased in Embodiment 2 because the liquid crystal molecules between the comb-shaped electrodes were more easily tilted by the influence of the TFT substrate interface than in Comparative Example 2 where the liquid crystal molecules were vertically aligned without moving. As a result, the dark line appearing between the electrodes is thinned to increase the transmittance.

These results show that a change in the pretilt angle needs to be determined depending on the use conditions and the cell thickness in consideration of the weights given to the response speed and the transmittance.

(Verification of the Effect of Embodiment 3)

Simulation was performed under evaluation conditions of a cell thickness of 5.4 μm and an electrode gap of 2.0 μm. The results of the simulation are shown below.

Figure 26:
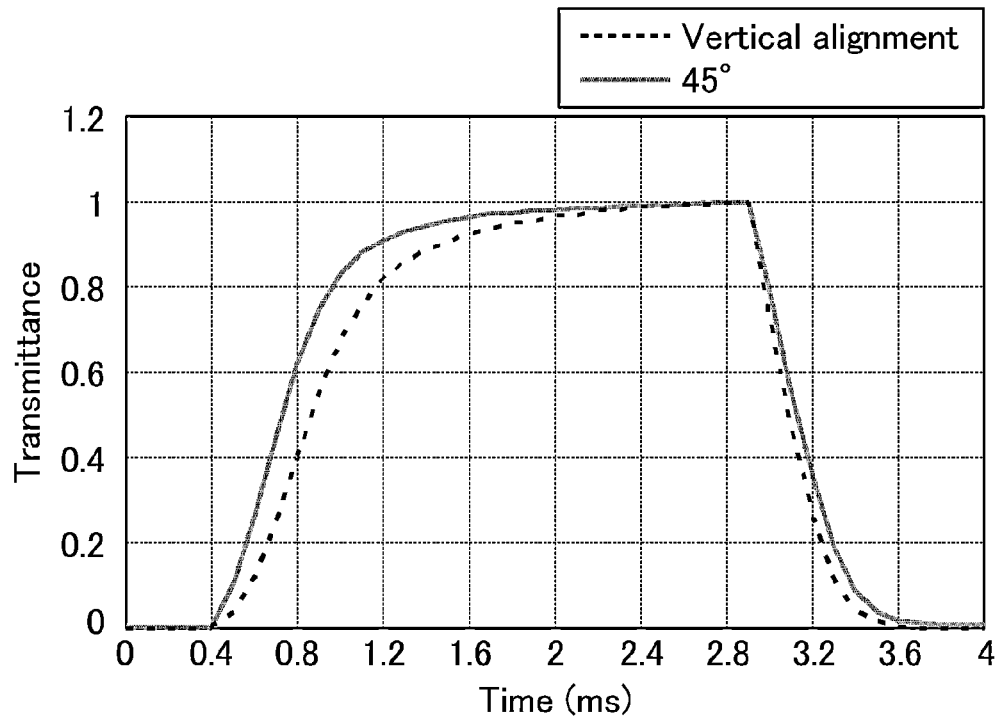
FIG. 26 is a graph showing response waveforms in liquid crystal display panels of Embodiment 3 and Comparative Example 3.
Figure 27:
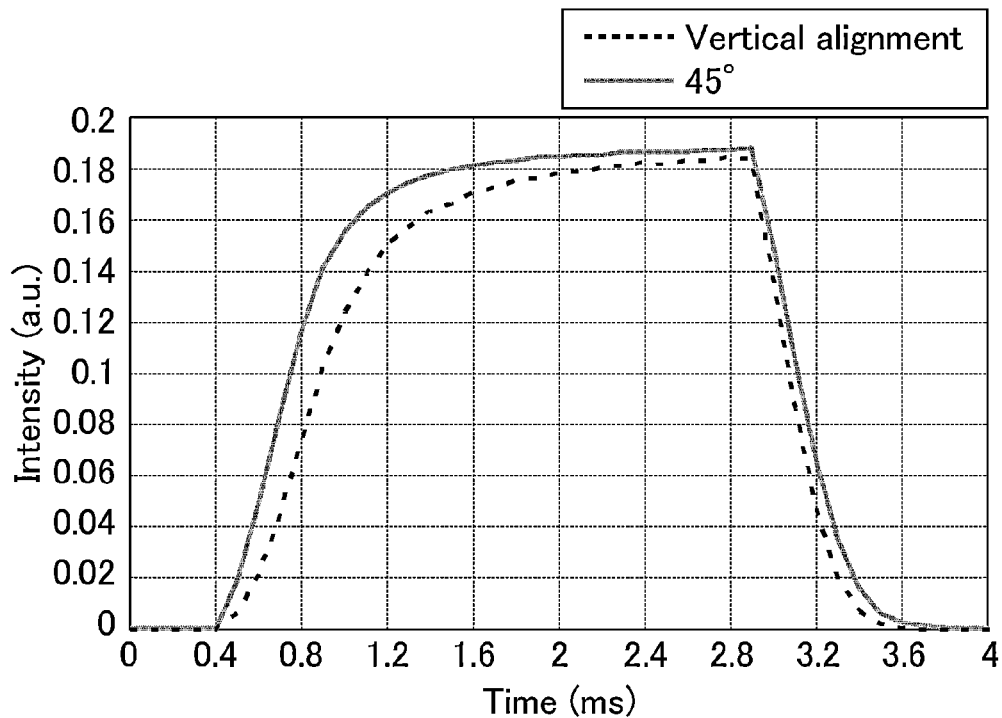
FIG. 27 is another graph showing response waveforms in the liquid crystal display panels of Embodiment 3 and Comparative Example 3.

FIG. 26 and FIG. 27 each are a graph showing the response waveforms of the liquid crystal display panels of Embodiment 3 and Comparative Example 3.

FIG. 26 and FIG. 27 show the optical characteristics in the case where a recess is provided in the slit between the upper electrodes, appearing as the response waveforms when the pretilt angle of the liquid crystal molecules on the TFT substrate side is changed. Also in the case where substantially the entire insulating layer in the slit between the upper electrodes is recessed as in Embodiment 3, the characteristic are different depending on the conditions such as the cell thickness, similarly to Embodiment 1 and Embodiment 2. The configuration in Comparative Example 3 is the same as that in Embodiment 3 except that the insulating layer is not recessed substantially entirely in the slit between the upper electrodes, and the insulating layer has a flat surface. The graph of FIG. 26 shows the transmittance standardized at the light intensity in white display, and the graph of FIG. 27 shows the response waveform (response waveform of light intensity) before the standardization.

FIG. 27 shows that when the pretilt angle is changed, the display panel with a recess in the insulating layer) (45° achieves a higher light intensity by about 3% compared to the display panel without a recess in the insulating layer (vertical alignment).

Also, the display panel with a recess in the insulating layer (45°) shows a response speed of 0.7 ms in the change in the transmittance from 10% to 90%, while the display panel without a recess (vertical alignment) shows a response speed of 1.0 ms, which means that the response speed has been increased.

Figure 28:
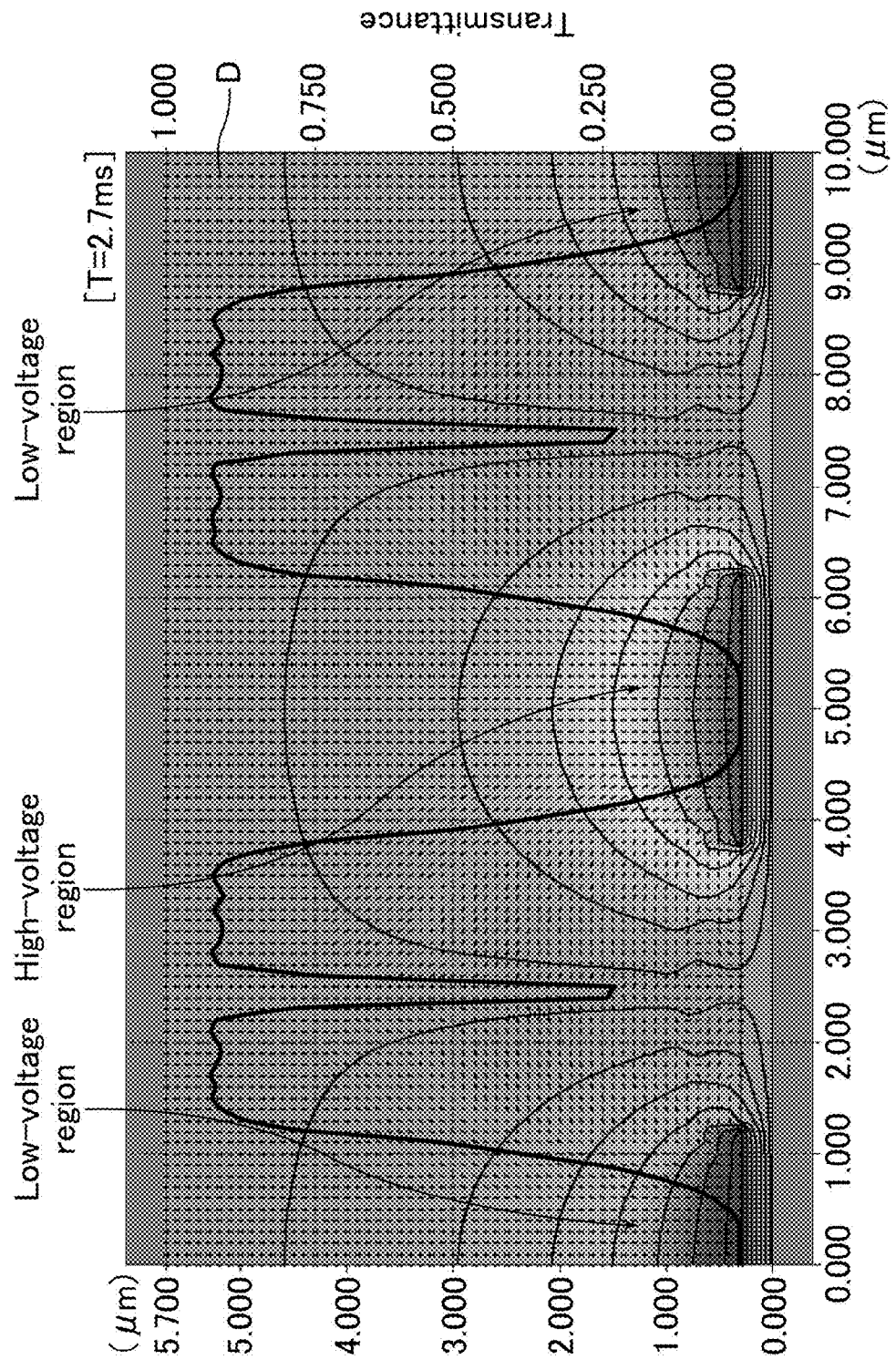
FIG. 28 shows simulation results relating to the liquid crystal display panel of Embodiment 3.
Figure 29:
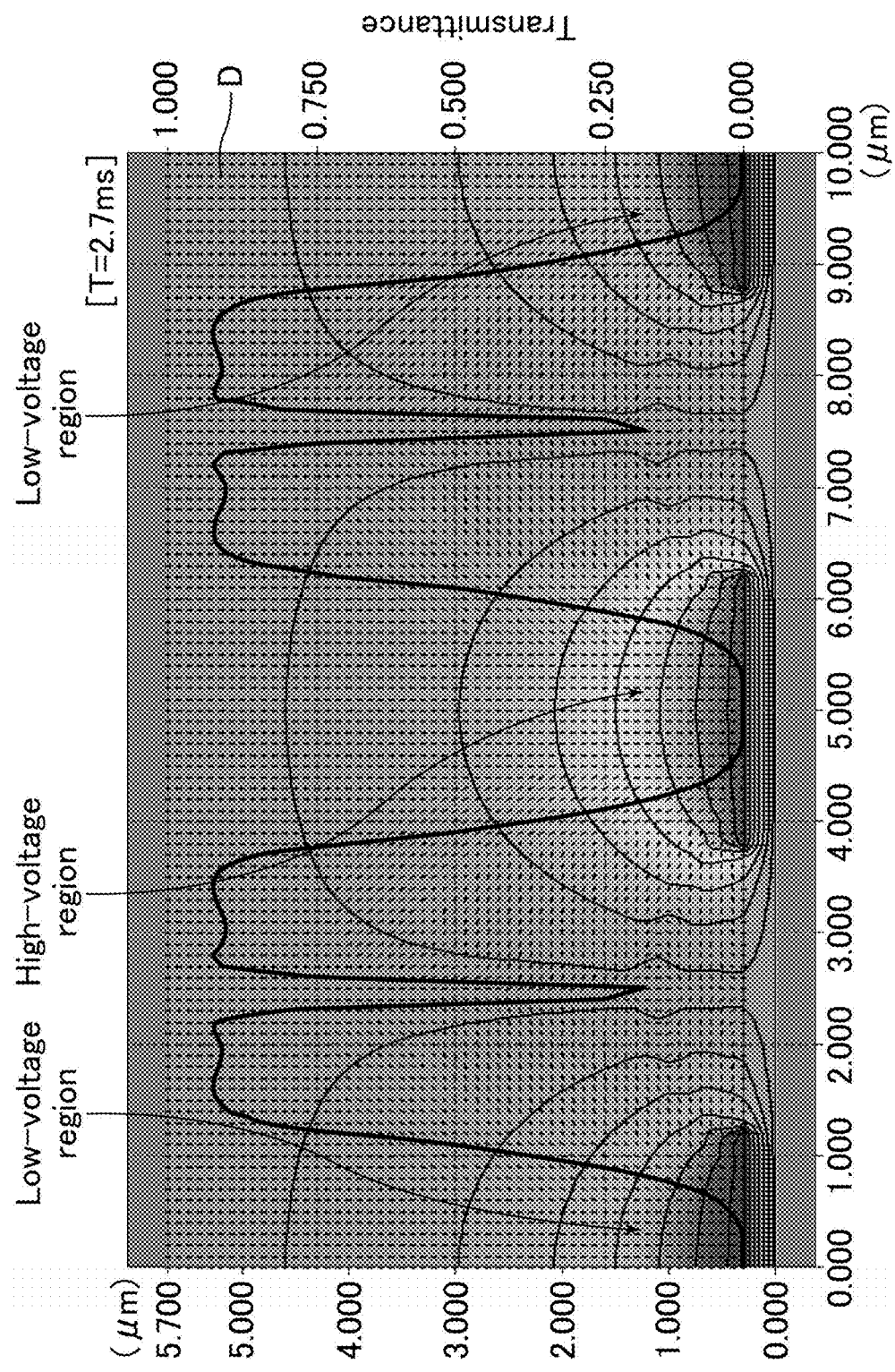
FIG. 29 shows simulation results relating to the liquid crystal display panel of Comparative Example 3.

FIG. 28 shows simulation results relating to the liquid crystal display panel of Embodiment 3, including the alignment distribution and in-plane transmittance distribution in white display. FIG. 29 shows simulation results relating to the liquid crystal display panel of Comparative Example 3, including the alignment distribution and in-plane transmittance distribution in white display. The symbol "D" indicates the direction of liquid crystal molecules.

The response speed and the transmittance increased in Embodiment 3 for the same reasons as those described in Embodiment 1.

(Verification of the Effect of Embodiment 4)

Simulation was performed under evaluation conditions of a cell thickness of 3.4 μm and an electrode gap of 2.0 μm. The results of the simulation are shown below.

Figure 30:
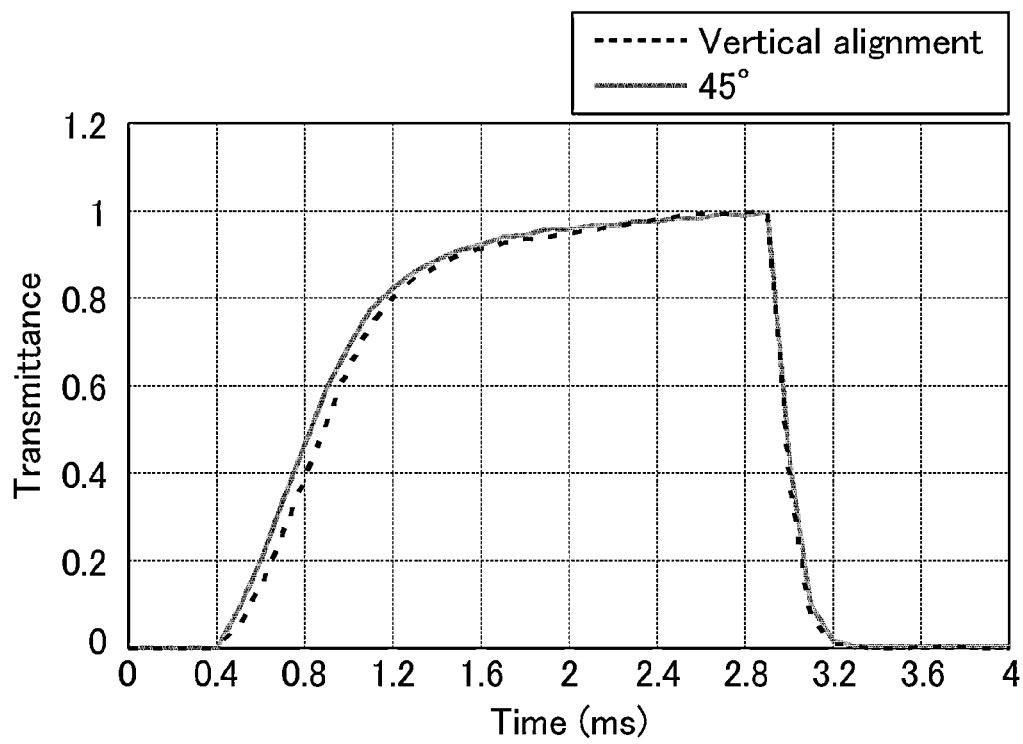
FIG. 30 is a graph showing response waveforms in liquid crystal display panels of Embodiment 4 and Comparative Example 4.
Figure 31:
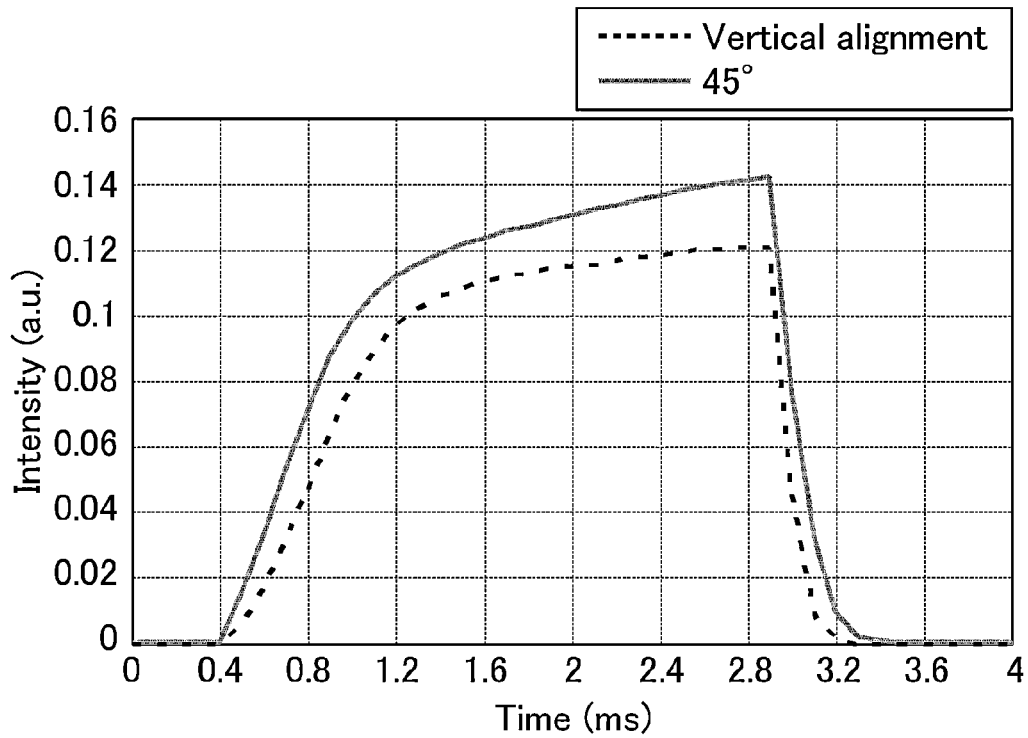
FIG. 31 is another graph showing response waveforms in the liquid crystal display panels of Embodiment 4 and Comparative Example 4.

FIG. 30 and FIG. 31 each are a graph showing the response waveforms of the liquid crystal display panels of Embodiment 4 and Comparative Example 4. FIG. 30 and FIG. 31 show the response waveforms when the pretilt angle of the liquid crystal molecules on the TFT substrate side was changed. The configuration in Embodiment 4 is the same as that in Embodiment 3 except that the cell thickness (thickness of the liquid crystal layer) was changed from 5.4 μm to 3.4 μm. The configuration in Embodiment 4 is the same as that in Embodiment 3 except that the cell thickness (thickness of the liquid crystal layer) was changed from 5.4 μm to 3.4 μm. The graph of FIG. 30 shows the transmittance standardized at the light intensity in white display, and the graph of FIG. 31 shows the response waveform (response waveform of light intensity) before the standardization.

That light intensity of the display panel with a recess in the insulating layer (pretilt angle is 45° from the normal direction to the main faces of the substrates) is increased by about 17% compared to the display panel without a recess in the insulating layer (vertical alignment).

In contrast, the display panel with a recess in the insulating layer exhibits faster initial rising, but regarding the response speed for the change in the transmittance from 10% to 90%, the display panel without a recess in the insulating layer (vertical alignment) exhibits a response speed of 1.0 ms while the display panel with a recess in the insulating layer (pretilt angle is 45° from the normal direction to the main faces of the substrates) exhibits a slow response speed of 1.4 ms.

Figure 32:
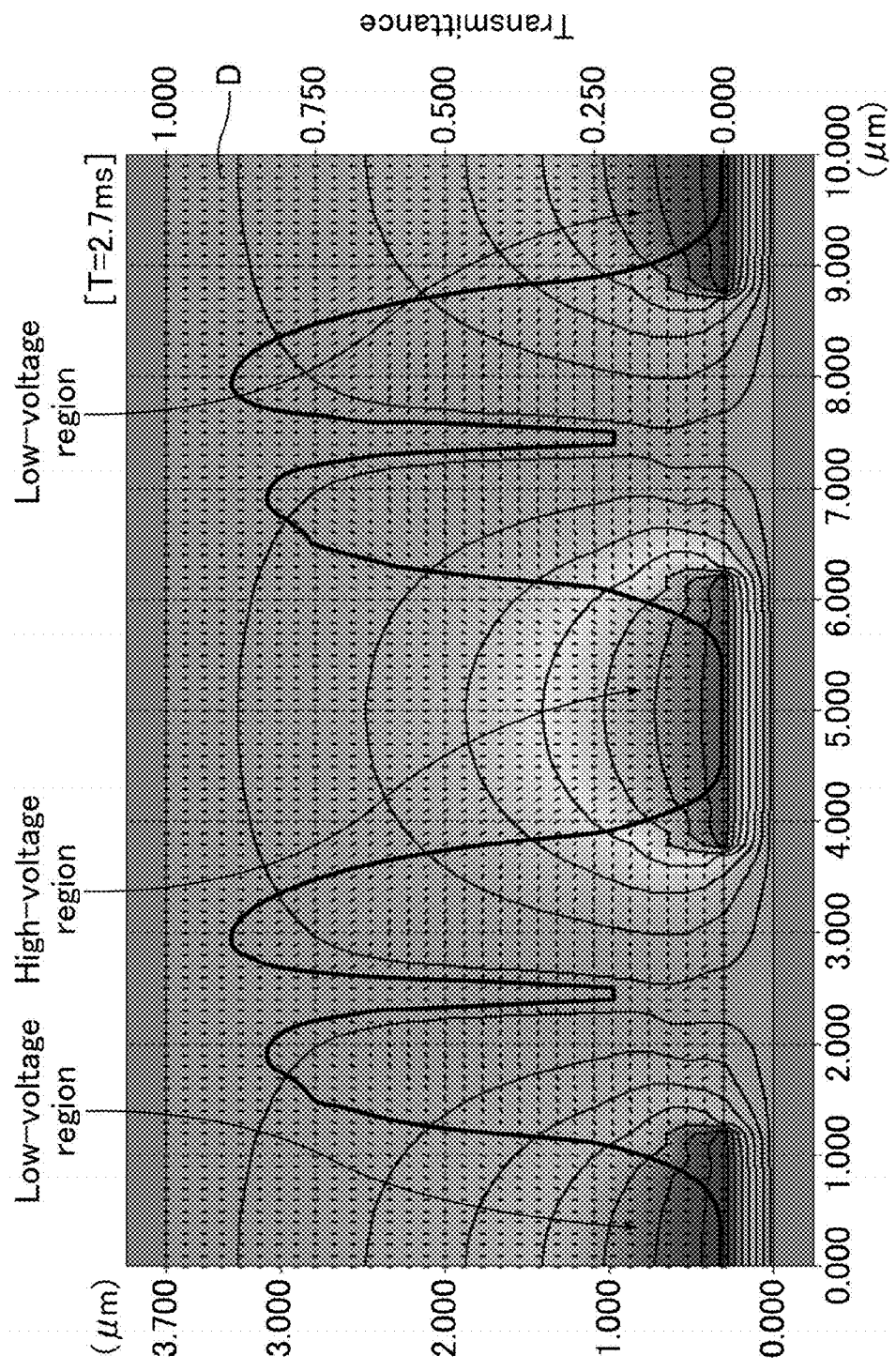
FIG. 32 shows simulation results relating to the liquid crystal display panel of Embodiment 4.
Figure 33:
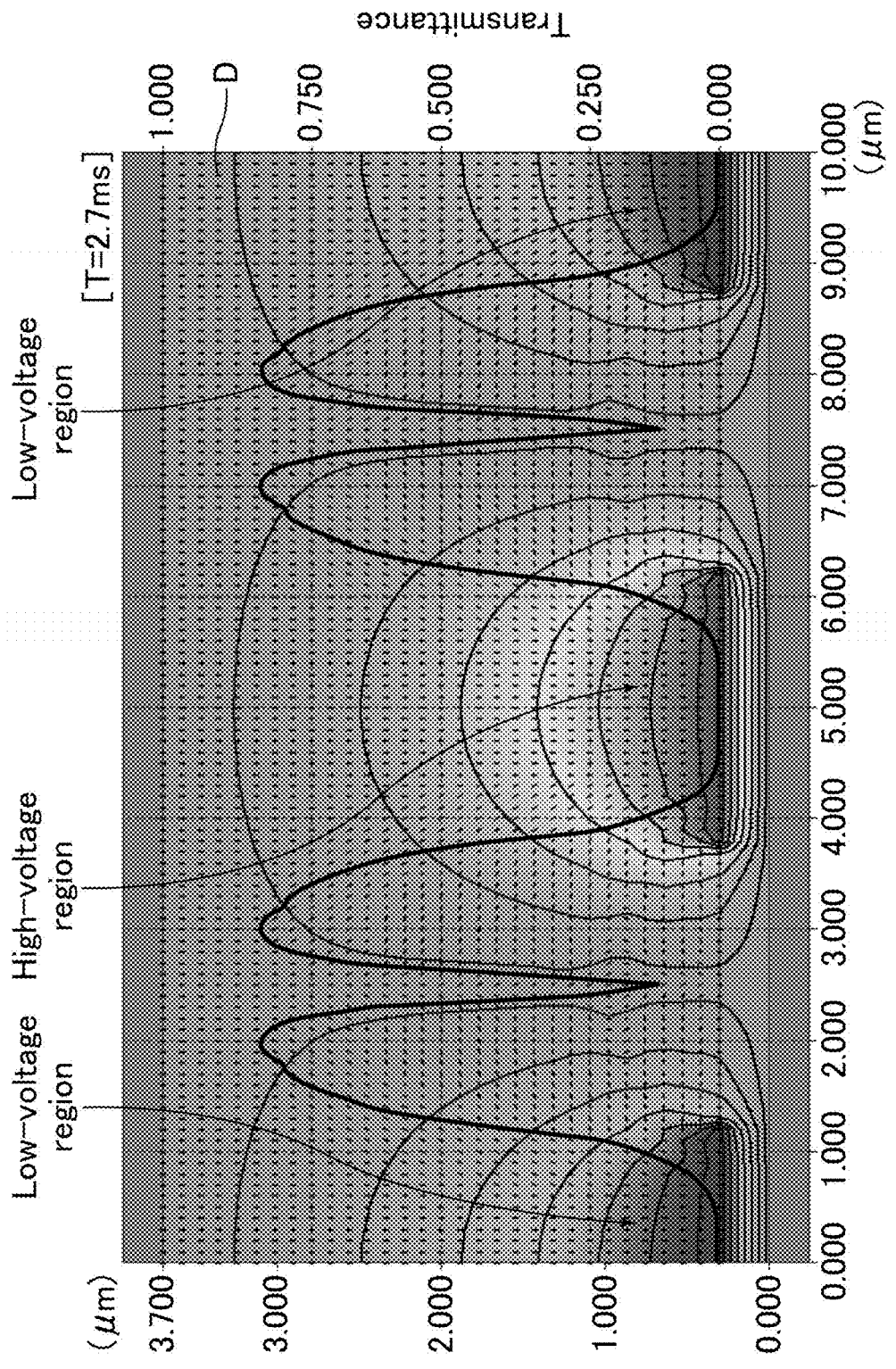
FIG. 33 shows simulation results relating to the liquid crystal display panel of Comparative Example 4.

FIG. 32 shows simulation results relating to the liquid crystal display panel of Embodiment 4, including the alignment distribution and in-plane transmittance distribution in white display. FIG. 33 shows simulation results relating to the liquid crystal display panel of Comparative Example 4, including the alignment distribution and in-plane transmittance distribution in white display. The symbol "D" indicates the direction of liquid crystal molecules.

The response speed slightly decreased in Embodiment 4 because the transmittance in the case with pretilt (45° from the normal direction to the main faces of the substrates) significantly increased, which eventually led to a large difference in the brightness. Also, the transmittance increased in Embodiment 4 because the liquid crystal molecules between the comb-shaped electrodes were more easily tilted by the influence of the TFT substrate interface than in Comparative Example 4 where the liquid crystal molecules were vertically aligned without moving. As a result, the dark line appearing between the electrodes is thinned to increase the transmittance.

As mentioned above, in Embodiment 5, the same effect as that in Embodiment 3 and Embodiment 4 is achieved with flat surface.

The liquid crystal display panel of Embodiment 5 utilizes the PSA technique. The PSA technique disperses UV-sensitive monomers in a liquid crystal material, applies a desired voltage to the liquid crystal, and fixes the liquid crystal molecules near the alignment film by ultraviolet light (UV light) irradiation.

The liquid crystal display panel of the present invention is capable of utilizing a field-induced photo-reactive alignment (FPA) technique. The FPA technique utilizes a UV-sensitive functional group in the alignment film, and applies a voltage in the same manner as in the PSA technique to fix the liquid crystal molecules near the alignment film. The only difference between the PSA technique and FPA technique is that the matter for fixing the alignment of the liquid crystal molecules is dispersed in the liquid crystal or formed on the alignment film. Both techniques are suitable for the present invention.

Reference Example 2

Figure 34:
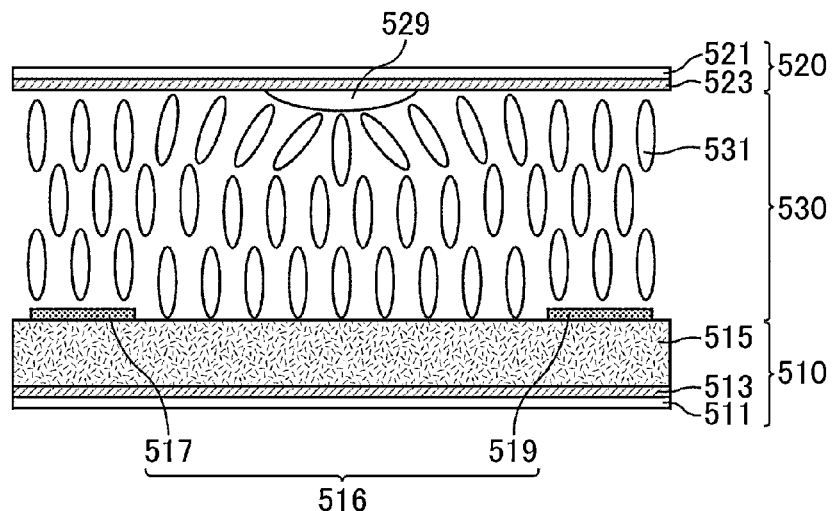
FIG. 34 is a schematic cross-sectional view showing a black display state in a liquid crystal display panel of Reference Example 2.

FIG. 34 is a schematic cross-sectional view showing a black display state in a liquid crystal display panel of Reference Example 2. In Reference Example 2, pretilt is provided to the liquid crystal molecules on the opposed substrate side by providing projections (ribs) 529 on the opposed substrate side.

Figure 35:
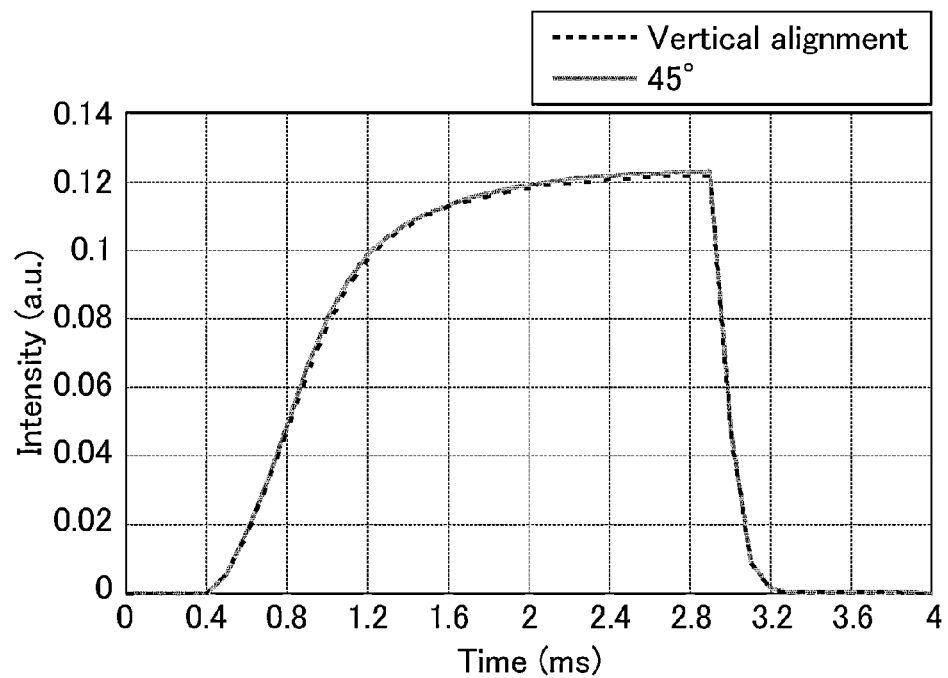
FIG. 35 is a graph showing response waveforms in liquid crystal display panels of Comparative Example 2 and Reference Example 2.

FIG. 35 is a graph showing the response waveforms in the liquid crystal display panels of Comparative Example 2 and Reference Example 2, which was obtained by simulating the improvement made by the projections 529 on the opposed substrate side (provision of pretilt to the liquid crystal molecules on the opposed substrate side).

Here, the change in the characteristics when the pretilt angle on the TFT substrate side is the same as described above (e.g. FIG. 23), and the light intensity is increased by provision of pretilt.

However, a change in the pretilt angle on the opposed substrate side did not show much difference in the characteristics (FIG. 35).

The tilt of the alignment on the opposed substrate side hardly changes because a vertical electric field is generated between the counter electrode and the comb-shaped electrodes under a voltage providing white display. Accordingly, a change in the pretilt angle is not considered to cause a change in the characteristics.
(Preferred Range for Pretilt Angle)

Figure 36:
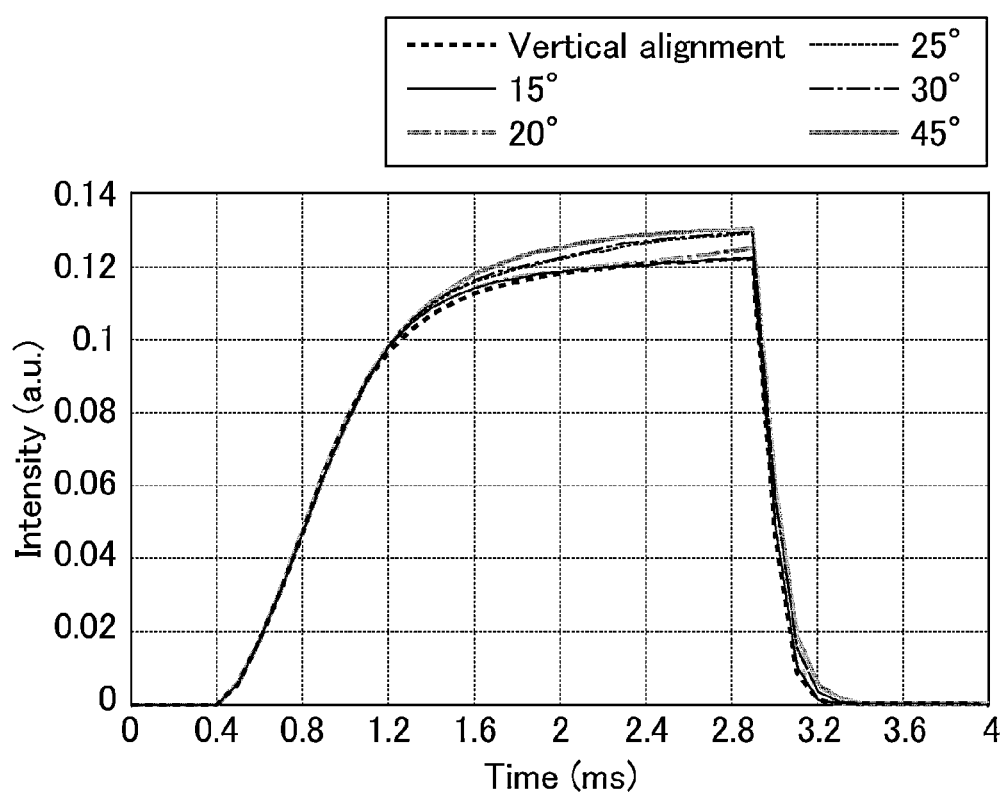
FIG. 36 is a graph showing a pretilt angle dependence of response waveforms when the pretilt angle is changed.
Figure 37:
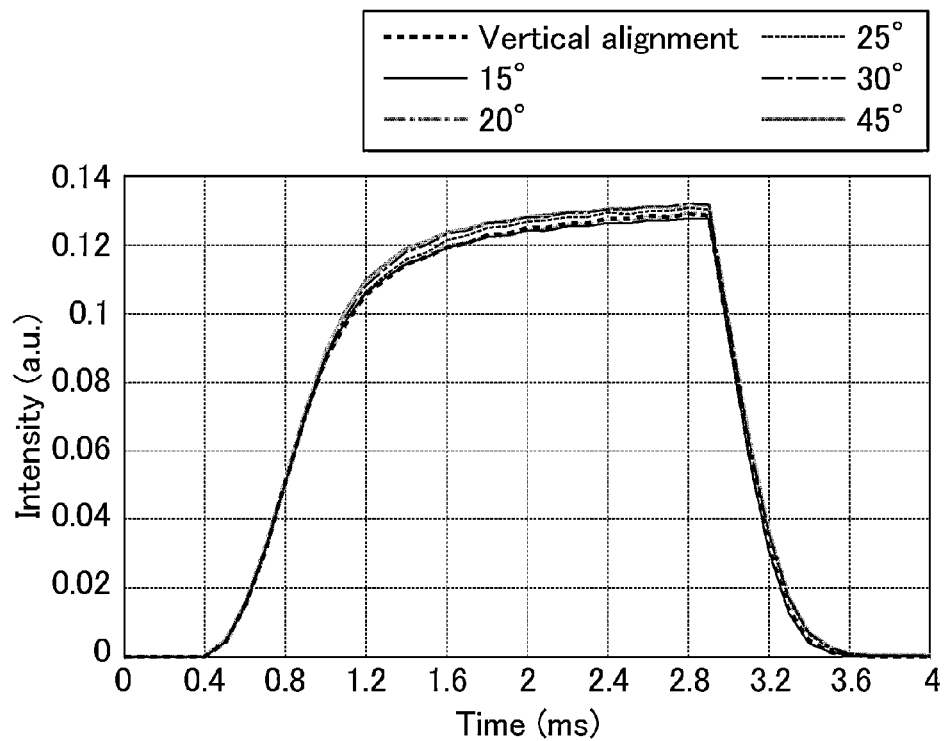
FIG. 37 is another graph showing a pretilt angle dependence of response waveforms when the pretilt angle is changed.

FIG. 36 and FIG. 37 each are a graph showing the pretilt angle dependency of the response waveform when the pretilt angle is changed. The evaluation conditions for the simulation in FIG. 36 are a cell thickness of 3.4 µm and an electrode gap of 2.0 µm. The evaluation conditions for the simulation in FIG. 37 are a cell thickness of 5.4 µm and an electrode gap of 2.0 µm.

The results show that providing a pretilt angle of at least 25° greatly changes the response waveform (increases the light intensity).

This means that a pretilt angle of at least 25°, for example, is effective and preferred, although the pretilt angle is not limited to this range. The pretilt angle is preferably at most 60°.

Since the liquid crystal display panels and the liquid crystal display devices in the above embodiments achieve a high response speed, they preferably employ a feed sequential method, and are preferably used for onboard applications and 3D display applications (display devices capable of displaying three-dimensional images).

The above embodiments use positive liquid crystal molecules. The effect of the present invention can be achieved similarly even when negative liquid crystal molecules are used. In the embodiments mentioned above, the upper substrate may further be provided with a dielectric layer. In this case, the utilization efficiency of light increases to achieve the above effects such as increasing the transmittance.

The concept of the present invention is suitable for ON-ON mode liquid crystal display panels using a pair of comb-shaped electrodes in a three-layered electrode structure. Still, the pretilt-providing structure of the present invention is applicable to FFS-mode liquid crystal display devices using slit electrodes in place of the pair of comb-shaped electrodes. In the ON-ON mode, the alignment of the liquid crystal molecules on the TFT substrate side is changed from the vertical alignment to substantially parallel alignment under a voltage, and the liquid crystal molecules are aligned substantially vertically to the length direction of the slits in a plan view of the main faces of the substrates. For this reason, the structures (recesses) in the center portions of the slits can be arranged in parallel to the slits in a plan view of the main faces of the substrates. Thereby, no alignment disorder occurs and a sufficiently high contrast ratio can be achieved. The ON-ON mode is thus more suitable.

The configurations such as electrode structures and insulator shapes of the liquid crystal display panel and liquid crystal display device of the present invention can be observed by microscopic observation of the TFT substrate and the opposed substrate using a device such as scanning electron microscope (SEM).

Comparative Example 5

Figure 38:
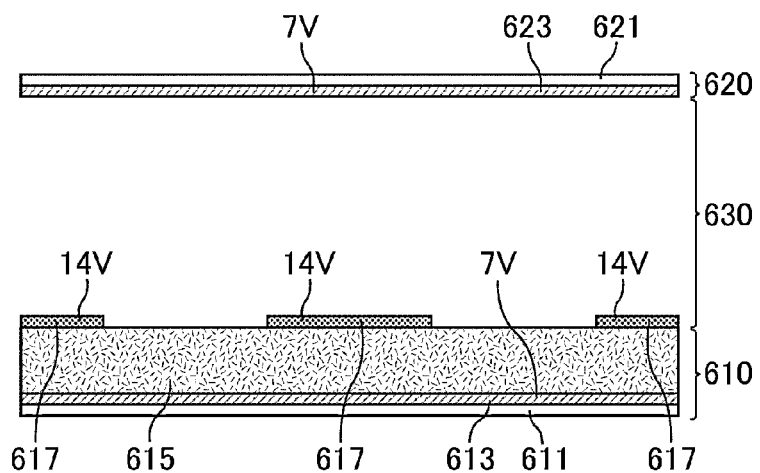
FIG. 38 is a schematic cross-sectional view of the liquid crystal display panel of Comparative Example 5 when a fringe electric field is generated.
Figure 39:
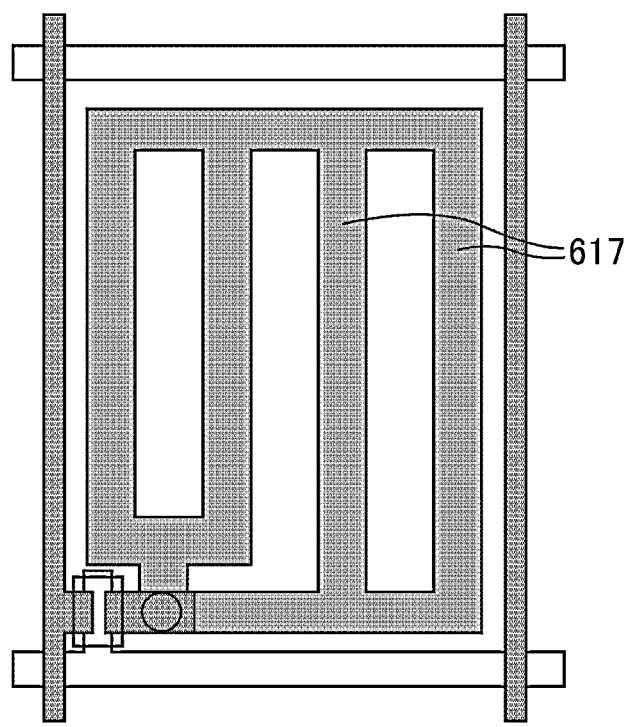
FIG. 39 is a schematic plan view of a liquid crystal display panel shown in FIG. 38.
Figure 40:
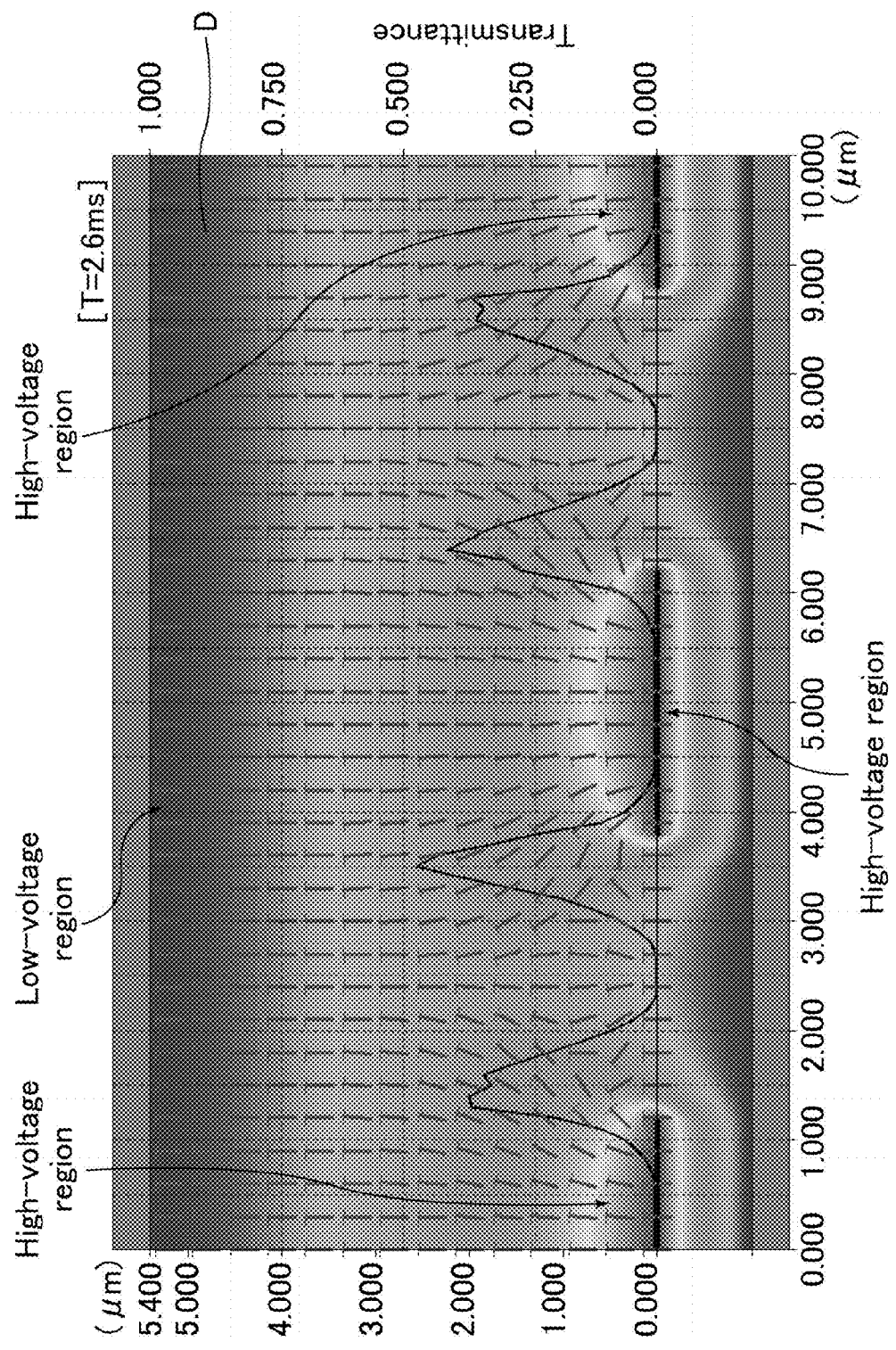
FIG. 40 shows simulation results relating to the liquid crystal display panel shown in FIG. 38.

FIG. 38 is a schematic cross-sectional view showing a liquid crystal display panel of Comparative Example 5 in the presence of a fringe electric field. FIG. 39 is a schematic plan view showing the liquid crystal display panel shown in FIG. 38. FIG. 40 shows simulation results relating to the liquid crystal display panel shown in FIG. 38.

The liquid crystal display panel of Comparative Example 5 generates a fringe electric field by FFS driving as in Patent Literature 1. FIG. 40 shows the simulation results (cell thickness: 5.4 µm, slit gap: 2.6 µm) of director D, electric field, and transmittance distribution. The reference numbers in FIG. 38 relating to Comparative Example 5 are the same as those in the drawings relating to Embodiment 1, except that the numeral "6" is added as the hundred's digit.

In FIG. 38, the slit electrode 617 is set to 14 V and the opposite planar electrode is set to 7 V. For example, the slit electrode may be set to 5 V and the opposite planar electrode may be set to 0 V. In the FFS driving display (slit electrode is used instead of a pair of comb-shaped electrodes) disclosed in Patent Literature 1, a fringe electric field generated between the upper and lower electrodes on the lower substrate rotates the liquid crystal molecules. In this case, only the liquid crystal molecules near the slit electrode edge rotate. Thus, the transmittance in the simulation was as low as 3.6%. The transmittance was not improved unlike the aforementioned embodiments and reference examples.

Other Preferable Embodiments

In the embodiments of the present invention, an oxide semiconductor TFT (e.g. IGZO) is preferably used. The following will describe this oxide semiconductor TFT in detail.

At least one of the first substrate and the second substrate usually includes a thin film transistor element. The thin film transistor element preferably includes an oxide semiconductor. In other words, an active layer of an active drive element (TFT) in the thin film transistor element is preferably formed using an oxide semiconductor film such as zinc oxide instead of a silicon semiconductor film. Such a TFT is referred to as an "oxide semiconductor TFT". The oxide semiconductor characteristically shows a higher carrier mobility and less unevenness in its properties than amorphous silicon. Thus, the oxide semiconductor TFT moves faster than an amorphous silicon TFT, has a high driving frequency, and is suitably used for driving of higher-definition next-generation display devices. In addition, the oxide semiconductor film is formed by an easier process than a polycrystalline silicon film. Thus, it is advantageously applied to devices requiring a large area.

The following characteristics markedly appear in the case of applying the liquid crystal driving method of the present embodiments especially to FSDs (field sequential display devices).

Figure 41:
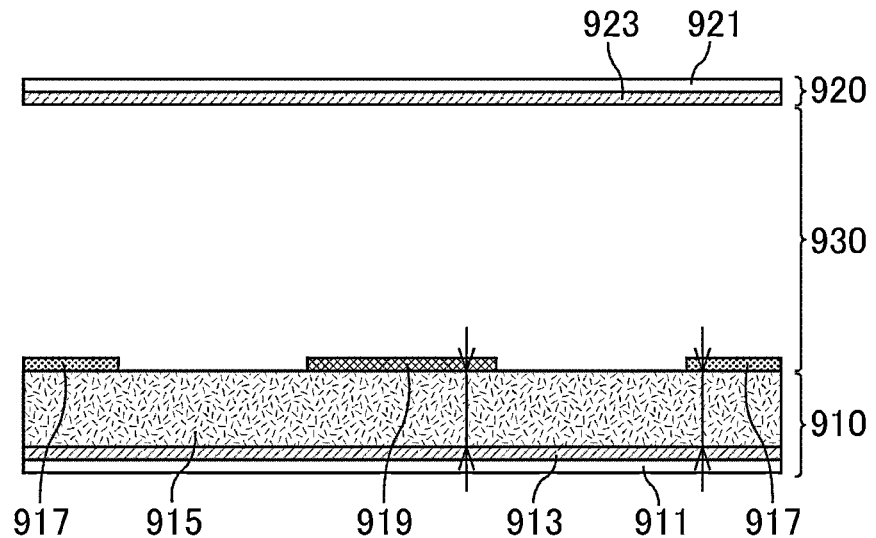
FIG. 41 is a schematic cross-sectional view showing one example of a liquid crystal display device used in the liquid crystal driving method of the present embodiment.

(1) The pixel capacitance is higher than that in a usual VA (vertical alignment) mode (FIG. 41 is a schematic cross-sectional view showing one example of a liquid crystal display device used in the liquid crystal driving method of the present embodiments; in FIG. 41, a large capacitance is generated between the upper electrode and the lower electrode at the portion indicated by an arrow and the pixel capacitance is higher than in the liquid crystal display device of usual vertical alignment (VA) mode). (2) One pixel of a FSD type is equivalent to three pixels (RGB), and thus the capacitance of one pixel is trebled. (3) The gate ON time is very short because 240 Hz or higher driving is required.

Advantages of applying the oxide semiconductor TFT (e.g. IGZO) are as follows.

Based on the characteristics (1) and (2), a 52-inch device has a pixel capacitance of about 20 times as high as a 52-inch UV2A 240-Hz drive device.

Thus, a transistor produced using conventional a-Si is as great as about 20 times or more, disadvantageously resulting in an insufficient aperture ratio.

The mobility of IGZO is about 10 times that of a-Si, and thus the size of the transistor is about $\frac{1}{10}$.

Although the liquid crystal display device using color filters (RGB) has three transistors, the FSD type device has only one transistor. Thus, the device can be produced in a size as small as or smaller than that with a-Si.

As the size of the transistor becomes smaller, the Cgd capacitance also becomes smaller. This reduces the load on the source bus lines.

Specific Examples

Figure 42:
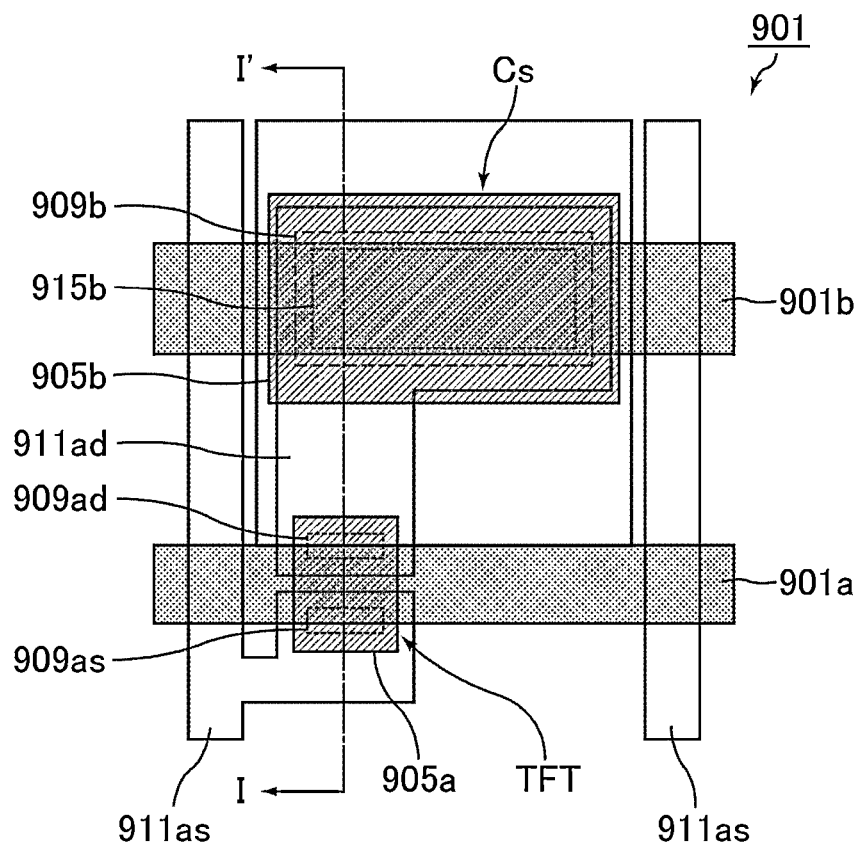
FIG. 42 is a schematic plan view showing an active drive element and its vicinity used in the present embodiment.
Figure 43:
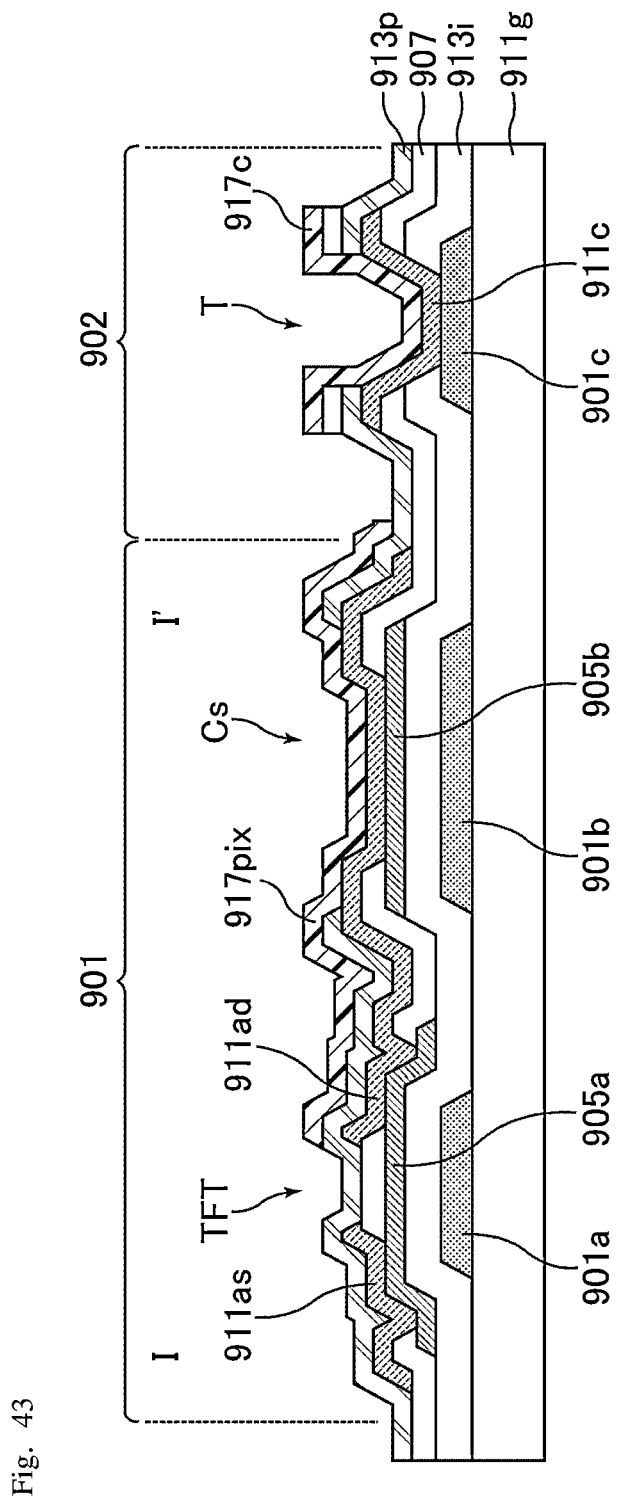
FIG. 43 is a schematic cross-sectional view showing the active drive element and its vicinity used in the present embodiment.

FIG. 42 and FIG. 43 each show a structure (example) of the oxide semiconductor TFT. FIG. 42 is a schematic plan view showing the active drive element and its vicinity used in the present embodiment. FIG. 43 is a schematic cross-sectional view showing an active drive element and its vicinity used in the present embodiment. The symbol T indicates a gate and source terminal. The symbol Cs indicates an auxiliary capacitance.

The following will describe one example (the portion in question) of a production process of the oxide semiconductor TFT.

Active layer oxide semiconductor layers 905a and 905b of an active drive element (TFT) using the oxide semiconductor film are formed as follows.

At first, an In—Ga—Zn—O semiconductor (IGZO) film with a thickness of 30 nm or greater but 300 nm or smaller is formed on an insulating layer 913i by sputtering. Then, a resist mask is formed by photolithography so as to cover predetermined regions of the IGZO film. Next, portions of the IGZO film other than the regions covered by the resist mask are removed by wet etching. Thereafter, the resist mask is peeled off. This provides island-shaped oxide semiconductor layers 905a and 905b. The oxide semiconductor layers 905a and 905b may be formed using other oxide semiconductor films instead of the IGZO film.

Next, an insulating layer 907 is deposited on the whole surface of a substrate 911g and the insulating layer 907 is patterned.

Specifically, at first, an $SiO_2$ film (thickness: about 150 nm, for example) as an insulating layer 907 is formed on the insulating layer 913i and the oxide semiconductor layers 905a and 905b by CVD.

The insulating layer 907 preferably includes an oxide film such as SiOy.

Use of the oxide film can recover oxygen deficiency on the oxide semiconductor layers 905a and 905b by the oxygen in the oxide film, and thus it more effectively suppresses oxygen deficiency on the oxide semiconductor layers 905a and 905b. Here, a single layer of an $SiO_2$ film is used as the insulating layer 907. Still, the insulating layer 907 may have a stacked structure of an $SiO_2$ film as a lower layer and an SiNx film as an upper layer.

The thickness (in the case of a stacked structure, the sum of the thicknesses of the layers) of the insulating layer 907 is preferably 50 nm or greater but 200 nm or smaller. The insulating layer with a thickness of 50 nm or greater more securely protects the surfaces of the oxide semiconductor layers 905a and 905b in the step of patterning the source and drain electrodes. If the thickness of the insulating layer exceeds 200 nm, the source electrodes and the drain electrodes may have a higher step, so that breaking of lines may occur.

The oxide semiconductor layers 905a and 905b in the present embodiment are preferably formed from a Zn—O semiconductor (ZnO), an In—Ga—Zn—O semiconductor (IGZO), an In—Zn—O semiconductor (IZO), or a Zn—Ti—O semiconductor (ZTO). Particularly preferred is an In—Ga—Zn—O semiconductor (IGZO).

The present mode provides certain effects in combination with the above oxide semiconductor TFT. Still, the present mode can be driven using a known TFT element such as an amorphous Si TFT or a polycrystalline Si TFT.

The aforementioned modes of the embodiments may be employed in appropriate combination as long as the combination is not beyond the spirit of the present invention.

The present application claims priority to Patent Application No. 2011-142349 filed in Japan on Jun. 27, 2011 under the Paris Convention and provisions of national law in a designated State, the entire contents of which are hereby incorporated by reference.

REFERENCE SIGNS LIST 10, 110, 210, 310, 410, 510, 610: Array substrate
11, 21, 111, 121, 211, 221, 311, 321, 411, 421, 511, 521, 611, 621: Glass substrate
13, 23, 113, 123, 213, 223, 313, 323, 413, 423, 513, 523, 613, 623: Counter electrode
15, 115, 215, 315, 415, 515, 615: Insulating layer
16, 116, 216, 316, 416, 516: Pair of comb-shaped electrodes
17, 19, 117, 119, 217, 219, 317, 319, 417, 419, 517, 519: Comb-shaped electrode
20, 120, 220, 320, 420, 520, 620: Opposed substrate
30, 130, 230, 330, 430, 530, 630: Liquid crystal layer
31, 131, 231, 331, 431, 531: Liquid crystal (liquid crystal molecule)
529: Projection
617: Slit electrode

The invention claimed is:

1. A liquid crystal display panel comprising:
a first substrate;
a second substrate; and
a liquid crystal layer disposed between the first and second substrates,
the first substrate and the second substrate each including an electrode,
the electrode of the second substrate including a pair of comb-shaped electrodes and a planar electrode,
the liquid crystal layer containing liquid crystal molecules which, when a voltage lower than a threshold voltage is applied, are inclined from an orthogonal direction to main faces of the substrates, between the pair of comb-shaped electrodes in a plan view of the main faces of the substrates,
the liquid crystal layer further containing liquid crystal molecules which, when the voltage lower than the threshold voltage is applied, are aligned in the orthogonal direction to the main faces of the first and second substrates, on the pair of comb-shaped electrodes,
wherein the second substrate has a pretilt-providing structure between the pair of comb-shaped electrodes in a plan view of the main faces of the substrates,
wherein the liquid crystal display panel further comprises an insulating layer between the pair of comb-shaped electrodes and the planar electrode in the second substrate in a cross-sectional view of the main faces of the substrates, and the pretilt-providing structure is a recess formed on the insulating layer between the pair of comb-shaped electrodes in a plan view of the main faces of the substrates,
wherein the recess is formed at the center of a portion between the pair of comb-shaped electrodes in a plan view of the main faces of the substrates; and
wherein the liquid crystal layer further contains liquid crystal molecules which, when the voltage lower than the threshold voltage is applied, are aligned in the orthogonal direction to the main faces of the first and second substrates, between each of the pair of comb-shaped electrodes and the recess in a plan view of the main faces of the first and second substrates.

2. The liquid crystal display panel according to claim 1, wherein the pretilt-providing structure is a polymer on a face of the second substrate, the face being in contact with the liquid crystal layer.

3. The liquid crystal display panel according to claim 1, which further comprises a dielectric layer in the first substrate.

4. The liquid crystal display panel according to claim 1, which further comprises a vertical alignment film in each of the first substrate and the second substrate.

5. The liquid crystal display panel according to claim 1, wherein the electrode of the first substrate is a planar electrode.

6. The liquid crystal display panel according to claim 1, wherein the liquid crystal layer contains liquid crystal molecules with a positive anisotropy of dielectric constant.

7. The liquid crystal display panel according to claim 1, wherein at least one of the first substrate and the second substrate comprises a thin film transistor element, and the thin film transistor element comprises an oxide semiconductor.

8. A liquid crystal display device, comprising the liquid crystal display panel according to claim 1.

9. The liquid crystal display panel according to claim 1, wherein the planar electrode of the second substrate is arranged below the pair of comb-shaped electrodes with the insulating layer interposed therebetween, and a voltage applied to the planar electrode of the second substrate is different from a voltage applied to each of the pair of comb-shaped electrodes.

10. The liquid crystal display panel according to claim 9, wherein the second substrate is provided with thin-film transistors, and scanning signal lines and image signal lines which are separately connected to the respective thin-film transistors, and pixels defined by the scanning signal lines and the image signal lines are driven independently.

11. The liquid crystal display panel according to claim 1, wherein the planar electrode of the second substrate is arranged below the pair of comb-shaped electrodes with the insulating layer interposed therebetween, and portions of the planar electrode of the second substrate are electrically connected in a pixel line.

12. The liquid crystal display panel according to claim 11, wherein the planar electrode of the second substrate is planar at least at a portion overlapping the electrode of the first substrate in a plan view of the main faces of the first and second substrates.

13. The liquid crystal display panel according to claim 11, wherein the planar electrode of the second substrate includes commonly connected portions corresponding to even-numbered lines and commonly connected portions corresponding to odd-numbered lines, and is driven to invert the electric potential changes of the commonly connected portions corresponding to even-numbered lines and the commonly connected portions corresponding to odd-numbered lines in response to application of a voltage to the portions.

14. The liquid crystal display panel according to claim 11, wherein a polarity of the voltage applied to portions of the planar electrode of the second substrate is inverted in each bus line.

* * * * *